(12) United States Patent
Sueyoshi

(10) Patent No.: US 8,799,435 B2
(45) Date of Patent: Aug. 5, 2014

(54) MANAGING APPARATUS, INFORMATION PROCESSING APPARATUS, PROGRAM, AND INFORMATION PROCESSING SYSTEM

(75) Inventor: Masahiro Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1230 days.

(21) Appl. No.: 12/465,376

(22) Filed: May 13, 2009

(65) Prior Publication Data
US 2009/0287807 A1 Nov. 19, 2009

(30) Foreign Application Priority Data

May 19, 2008 (JP) ................................ 2008-131290

(51) Int. Cl.
*G06F 15/16* (2006.01)
*G06F 15/173* (2006.01)

(52) U.S. Cl.
USPC ........... 709/223; 709/224; 709/225; 709/226; 709/200; 709/201; 709/202; 709/203

(58) Field of Classification Search
USPC ......... 709/223, 200, 201, 202, 203, 224, 225, 709/226
See application file for complete search history.

(56) References Cited

U.S. PATENT DOCUMENTS

| | | | | |
|---|---|---|---|---|
| 5,864,679 A * | 1/1999 | Kanai et al. | .................... | 709/238 |
| 6,058,267 A * | 5/2000 | Kanai et al. | ...................... | 712/28 |
| 6,125,388 A * | 9/2000 | Reisman | ........................ | 709/218 |
| 7,024,256 B2 * | 4/2006 | Krzyzanowski et al. | ....... | 700/65 |
| 2001/0013020 A1 * | 8/2001 | Yoshida et al. | ................. | 705/50 |
| 2002/0129132 A1 * | 9/2002 | Sato | .............................. | 709/223 |
| 2003/0035137 A1 * | 2/2003 | Shijo et al. | .................... | 358/1.15 |
| 2003/0119491 A1 * | 6/2003 | Maegawa | ....................... | 455/414 |
| 2004/0078169 A1 * | 4/2004 | Oba et al. | ....................... | 702/186 |
| 2004/0088567 A1 * | 5/2004 | Lamotte | ......................... | 713/200 |
| 2004/0163073 A1 * | 8/2004 | Krzyzanowski et al. | ..... | 717/107 |

(Continued)

FOREIGN PATENT DOCUMENTS

| | | |
|---|---|---|
| JP | 2001-333068 | 11/2001 |
| JP | 2002-175545 | 6/2002 |

(Continued)

OTHER PUBLICATIONS

Japanese Office Action for corresponding JP2008-131290 issued on May 18, 2010.

*Primary Examiner* — Rupal Dharia
*Assistant Examiner* — Mohammed Ahmed
(74) *Attorney, Agent, or Firm* — K&L Gates LLP

(57) ABSTRACT

There is provided a managing apparatus including a management-side communication unit that communicates with an information processing apparatus, which includes a first communication unit that communicates in a non-contact manner with an information processing terminal storing first information and second information and a second communication unit that communicates with an external device; a process target determining unit that determines whether the first communication unit is a management target based on identification information; a management information deriving unit that derives management information based on a determination result, the identification information, and service specification information, and transmits the derived management information to the information processing apparatus; a process authority determining unit that determines a process authority based on a process result transmitted from the information processing apparatus; and a processing unit that selectively executes a process related to the information processing apparatus based on a determination result.

17 Claims, 13 Drawing Sheets

(56) References Cited

U.S. PATENT DOCUMENTS

| | | | | |
|---|---|---|---|---|
| 2004/0205166 | A1* | 10/2004 | DeMoney | 709/219 |
| 2006/0294252 | A1* | 12/2006 | Shoji et al. | 709/230 |
| 2007/0088952 | A1* | 4/2007 | Hewitt et al. | 713/171 |
| 2008/0091776 | A1* | 4/2008 | Miyamoto | 709/203 |
| 2012/0071129 | A1* | 3/2012 | Haney | 455/404.2 |

FOREIGN PATENT DOCUMENTS

| | | |
|---|---|---|
| JP | 2003-288473 | 10/2003 |
| JP | 2004-171277 | 6/2004 |
| JP | 2004-532543 | 10/2004 |
| JP | 2006-344021 | 12/2006 |
| JP | 2007-072766 | 3/2007 |

* cited by examiner

FIG.3

| RW-ID | Activation Code | Service Provider Code #1 | Service Provider Code #2 | Service Provider Code #3 |
|---|---|---|---|---|
| 01E3△ | xxxxxx··· | xxxxxx··· | | |
| 125F□ | xxxxxx··· | xxxxxx··· | xxxxxx··· | xxxxxx··· |
| ··· | | | | |
| △B169 | xxxxxx··· | | xxxxxx··· | |
| □4△△1 | | | | |

10
12
14
16

MANAGING APPARATUS, INFORMATION PROCESSING APPARATUS, PROGRAM, AND INFORMATION PROCESSING SYSTEM

CROSS REFERENCES TO RELATED APPLICATIONS

The present application claims priority to Japanese Priority Patent Application JP 2008-131290 filed in the Japan Patent Office on May 19, 2008, the entire content of which is hereby incorporated by reference.

BACKGROUND

The present application relates to a managing apparatus, an information processing apparatus, a program, and an information processing system.

In recent years, information processing systems (so-called server/client systems), which execute various service processes between a managing apparatus such as a server and an information processing apparatus such as a PC (Personal Computer) or a mobile phone, using a network such as the Internet or a communication network of a mobile phone, have been socially spread. Examples of a service that is provided by the information processing systems may include a settlement service that is related to product purchasing.

Further, in recent years, information processing apparatuses, such as a PC or a mobile phone, have become multifunctional, and functions of the information processing apparatuses are realized by connection of various devices or mounting of the device functions. For example, when the information processing apparatus has a reader/writer function (function of subjectively transmitting a carrier), the information processing apparatus can communicate with an information processing terminal such as an IC (Integrated Circuit) card in a non-contact manner, using a magnetic field (carrier) having a specific frequency of, for example, 13.56 MHz.

Accordingly, when the information processing apparatus has a reader/writer function, a user of the information processing apparatus can use electronic money stored in an information processing terminal to enjoy various services, such as settlement services, which are provided by a managing apparatus.

A technique where a management information processing apparatus (server) manages a device (or mounted device) connected to an information processing apparatus (client) in a server/client system (information processing system) has been developed. For example, Japanese Patent Application Laid-Open (JP-A) No. 2006-344021 discloses a technique where a management information processing apparatus (server) manages a device connected to an information processing apparatus (client) and a device connected to one information processing apparatus (client) is shared with another information processing apparatus (client).

SUMMARY

When an information processing apparatus has a reader/writer function, a user of the information processing apparatus can enjoy a service provided by a managing apparatus, using an information processing terminal that stores service data related to a service (or information processing terminal that can store service data, which is applicable to the following description). In this case, the service data means data that is processed when a service provided by the managing apparatus is executed. Examples of the service data may include data that indicates electronic money, points, and coupons.

Further, in the information processing system according to the related art that manages a device (or mounted device) connected to an information processing apparatus, the managing apparatus according to the related art can manage a device (or device connected to the information processing apparatus) that realizes a reader/writer function included in the information processing apparatus.

However, in the information processing system according to the related art, the managing apparatus according to the related art only authenticates whether a device (or mounted device) connected to an information processing apparatus can be used. Accordingly, even though the technique according to the related art that manages the device (or mounted device) connected to the information processing apparatus is applied, the managing apparatus may not individually manage various services that the information processing apparatus can enjoy using an information processing terminal storing service data related to a service. For this reason, it is desired to provide an information processing system that can more flexibly manage services that an information processing apparatus can enjoy using an information processing terminal storing service data related to a service.

Accordingly, the present application addresses the above-identified and other issues associated with methods in related art and apparatuses. There is a need for a managing apparatus, an information processing apparatus, a program, and an information processing system that can individually manage various services that an information processing apparatus enjoys using an information processing terminal storing service data related to a service.

According to an embodiment, there is provided a managing apparatus. The managing apparatus includes: a management-side communication unit that communicates with an information processing apparatus including a first communication unit and a second communication unit, the first communication unit communicating on a first communication path in a non-contact manner with an information processing terminal storing first information indicating a corresponding system and second information indicating a corresponding service, the first communication path using a carrier at a predetermined frequency, the second communication unit communicating with an external device on a second communication path that is different from the first communication path; a process target determining unit that determines whether the first communication unit of the information processing apparatus is a management target, based on identification information for identifying the first communication unit of the information processing apparatus that is received by the management-side communication unit; a management information deriving unit that derives management information for managing the first communication unit of the information processing apparatus, based on a determination result of the process target determining unit, the identification information received by the management-side communication unit, and service specification information for the information processing terminal to identify the corresponding service, based on the first information and the second information received by the management-side communication unit, and transmits the derived management information to the information processing apparatus through the management-side communication unit; a process authority determining unit that determines a process authority with respect to the information processing apparatus, based on a process result transmitted from the information processing apparatus in accordance with the received management information; and a processing unit that selectively executes a process related to the information processing apparatus, based on a determination result in the process authority determining unit.

By this configuration, it is possible to individually manage various services that the information processing apparatus enjoys using the information processing terminal that stores service data related to a service.

The management information deriving unit may include: a first management information deriving unit that derives first management information indicating that the first communication unit of the information processing apparatus is managed, based on the identification information received by the management-side communication unit, when the process target determining unit determines that the first communication unit corresponding to the identification information is not the management target; and a second management information deriving unit that derives second management information for managing a service process between the first communication unit of the information processing apparatus and the information processing terminal, based on the first management information corresponding to the identification information and the service specification information, when the process target determining unit determines that the first communication unit corresponding to the identification information is the management target.

The process authority determining unit may determine that executing a service corresponding to the second management information derived by the second management information deriving unit is enabled, when the management-side communication unit receives a process result indicating that the corresponding information is equal to the transmitted second management information. The processing unit may execute a service process related to a service between the information processing apparatus and the processing unit, based on the determination result of the process authority determining unit.

The managing apparatus may further include: a storage unit that stores third management information where the identification information, the first management information, and the second management information are associated with each other and stored. The process target determining unit may determine whether the first communication unit corresponding to the identification information is managed, based on the identification information received by the management-side communication unit and the third management information.

The process authority determining unit may record the first management information derived by the first management information deriving unit in the third management information, when the management-side communication unit receives a process result indicating that the corresponding information is equal to the transmitted first management information. The process authority determining unit may associate the second management information derived by the second management information deriving unit with the first management information corresponding to the identification information and record an association result in the third management information, when the management-side communication unit receives a process result indicating that the corresponding information is equal to the transmitted second management information.

The storage unit may store a management database as the third management information, and the second management information deriving unit may search the management database based on the identification information received by the management-side communication unit, thereby specifying the first management information corresponding to the identification information.

According to another embodiment, there is provided an information processing apparatus. The information processing apparatus includes: a first communication unit that communicates with an information processing terminal storing first information indicating a corresponding system and second information indicating a corresponding service in a non-contact manner on a first communication path using a carrier at a predetermined frequency; a second communication unit that communicates with a managing apparatus managing a service between the managing apparatus and the information processing terminal using the first communication unit, on a second communication path that is different from the first communication path; a service specification information generating unit that acquires the first information and the second information from the information processing terminal through the first communication unit, and generates service specification information for the information processing terminal to identify the corresponding service, based on the acquired first information and second information; an information transmission control unit that transmits identification information for identifying the first communication unit and the generated service specification information to the managing apparatus through the second communication unit; an authority determining unit that determines whether the first communication unit is managed by the managing apparatus, based on management information for managing the first communication unit that is transmitted from the managing apparatus and received by the second communication unit, and transmits a process result indicating a determination result to the managing apparatus through the second communication unit; and a processing unit that selectively executes a service process executed between the information processing terminal and the processing unit, based on a determination result in the authority determining unit.

By this configuration, it is possible to enjoy a service using the information processing terminal while using the first communication unit that is managed by the managing apparatus.

The information processing apparatus may further include: a storage unit that may stores first management information indicating that the first communication unit is managed. The authority determining unit may record the management information received by the second communication unit as the first management information, when the first management information is not stored in the storage unit.

The authority determining unit may compare the first management information stored in the storage unit and the management information received by the second communication unit, when the first management information is stored in the storage unit. The authority determining unit may transmit a process result indicating that the first management information and the management information are equal to each other to the managing apparatus through the second communication unit, when the first management information and the management information are equal to each other.

The authority determining unit may derive second management information for the managing apparatus to manage a service process between the first communication unit and the information processing terminal, based on the first management information and the second information acquired from the information processing terminal, when the first management information and the management information are not equal to each other. The authority determining unit may compare the derived second management information and the management information received by the second communication unit, and transmit a process result according to a comparison result to the managing apparatus through the second communication unit.

The processing unit may selectively execute the service process, when the authority determining unit transmits a process result indicating that the derived second management information and the management information received by the second communication unit are equal to each other.

According to another embodiment, there is provided a program. The program allows a computer to function as the following units including: a communication unit that communicates with an information processing apparatus including a first communication unit and a second communication unit, the first communication unit communicating with an information processing terminal storing first information indicating a corresponding system and second information indicating a corresponding service in a non-contact manner on a first communication path using a carrier at a predetermined frequency, the second communication unit communicating with an external device on a second communication path that is different from the first communication path; a process target determining unit that determines whether the first communication unit of the information processing apparatus is a management target, based on identification information for identifying the first communication unit of the information processing apparatus that is received by the communication unit; a management information deriving unit that derives management information for managing the first communication unit of the information processing apparatus, based on a determination result of the process target determining unit, the identification information received by the communication unit, and service specification information for the information processing terminal to identify the corresponding service, based on the first information and the second information received by the communication unit, and transmits the derived management information to the information processing apparatus through the communication unit; a process authority determining unit that determines a process authority with respect to the information processing apparatus, based on a process result transmitted from the information processing apparatus in accordance with the received management information; and a processing unit that selectively executes a process related to the information processing apparatus, based on a determination result in the process authority determining unit.

By using this program, it is possible to individually manage various services that the information processing apparatus enjoys using the information processing terminal that stores service data related to a service.

According to another embodiment, there is provided a program. The program allows a computer to function as the following units including: a first communication unit that communicates with an information processing terminal storing first information indicating a corresponding system and second information indicating a corresponding service in a non-contact manner on a first communication path using a carrier at a predetermined frequency; a second communication unit that communicates with a managing apparatus managing a service between the managing apparatus and the information processing terminal using the first communication unit, on a second communication path that is different from the first communication path; a service specification information generating unit that acquires the first information and the second information from the information processing terminal through the first communication unit, and generates service specification information for the information processing terminal to identify the corresponding service, based on the acquired first information and second information; an information transmission control unit that transmits identification information for identifying the first communication unit and the generated service specification information to the managing apparatus through the second communication unit; an authority determining unit that determines whether the first communication unit is managed by the managing apparatus, based on management information for managing the first communication unit that is transmitted from the managing apparatus and received by the second communication unit, and transmits a process result indicating a determination result to the managing apparatus through the second communication unit; and a processing unit that selectively executes a service process executed between the information processing terminal and the processing unit, based on a determination result in the authority determining unit.

By using this program, it is possible to enjoy a service using the information processing terminal while using the first communication unit that is managed by the managing apparatus.

According to another embodiment, there is provided an information processing system. The information processing system includes: one or more information processing apparatuses that communicate with an information processing terminal in a non-contact manner using a carrier at a predetermined frequency; and a managing apparatus that communicates with the information processing apparatuses. Each of the information processing apparatuses includes a first communication unit that communicates with the information processing terminal in a non-contact manner on a first communication path using a carrier at a predetermined frequency, a second communication unit that communicates with the managing apparatus on a second communication path that is different from the first communication path, a service specification information generating unit that generates service specification information for the information processing terminal to identify a corresponding service, an information transmission control unit that transmits identification information for identifying the first communication unit and the generated service specification information to the managing apparatus through the second communication unit, an authority determining unit that determines whether the first communication unit is managed by the managing apparatus, based on management information for managing the first communication unit that is transmitted from the managing apparatus and received by the second communication unit, and transmits a process result indicating a determination result to the managing apparatus through the second communication unit, and a processing unit that selectively executes a service process executed between the information processing terminal and the processing unit, based on a determination result in the authority determining unit. The managing apparatus includes a management-side communication unit that communicates with the information processing apparatus, a process target determining unit that determines whether the first communication unit of the information processing apparatus is a management target, based on the identification information of the information processing apparatus that is received by the management-side communication unit, a management information deriving unit that derives the management information, based on a determination result of the process target determining unit, the identification information received by the management-side communication unit, and the service specification information received by the management-side communication unit, and transmits the derived management information to the information processing apparatus through the management-side communication unit, a process authority determining unit that determines a process authority with respect to the information processing apparatus, based on the process result transmitted from the information processing apparatus in accordance with the received management information, and a processing unit that selectively executes a process related to the information processing apparatus, based on a determination result in the process authority determining unit.

By this configuration, it is possible to realize an information processing system that can individually manage various services that the information processing apparatus enjoys using the information processing terminal that stores service data related to a service.

According to an embodiment, it is possible to individually manage various services that the information processing apparatus enjoys using the information processing terminal that stores service data related to a service.

Additional features and advantages are described in, and will be apparent from, the following Detailed Description and the figures.

BRIEF DESCRIPTION OF THE FIGURES

FIG. 3 is a diagram illustrating an example of a management database according to an embodiment;

DETAILED DESCRIPTION

Figure 1:
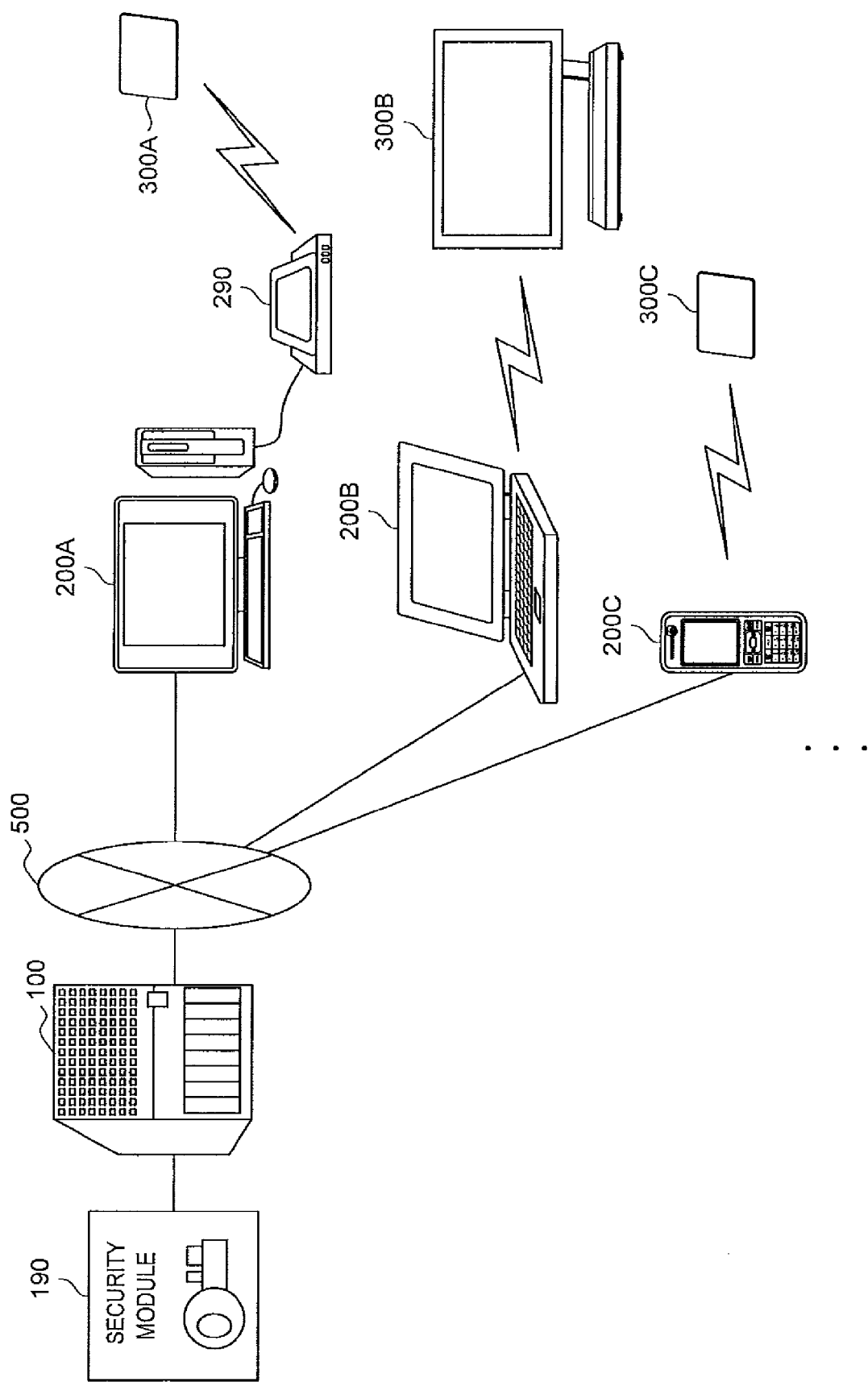
FIG. 1 is a diagram illustrating an example of an information processing system according to an embodiment.

Hereafter, the present application will be described in detail with reference to the appended drawings according to an embodiment. Note that in this specification and the appended drawings, structural elements that have substantially the same functions and structures are denoted with the same reference numerals and a repeated explanation of these structural elements is omitted.

Outline of an information processing system according to an embodiment.

FIG. 1 is a diagram illustrating an example of an information processing system (hereinafter, referred to as "information processing system 1000") according to an embodiment. Referring to FIG. 1, the information processing system 1000 includes a managing apparatus 100, information processing apparatuses 200A, 200B, 200C, . . . (hereinafter, they may be simply referred to as an "information processing apparatus 200"), and information processing terminals 300A, 300B, and 300C, . . . (hereinafter, they may be simply referred to as an "information processing terminal 300"). The managing apparatus 100 and the information processing apparatus 200 are connected to each other through a network 500. Further, the information processing apparatus 200 and the information processing terminal 300 are connected to each other using a reader/writer function that is mounted in the information processing apparatus 200 or through a reader/writer 290 that is connected to the information processing apparatus 200. FIG. 1 shows the configuration where the managing apparatus 100 and the information processing apparatus 200 are connected to each other through the network 500, but the present application is not limited thereto. The managing apparatus 100 and the information processing apparatus 200 may be directly connected to each other.

In this case, examples of the network 500 may include a wired network, such as an LAN (Local Area Network) or a WAN (Wide Area Network), a wireless network, such as a WWAN (Wireless Wide Area Network) or a WMAN (Wireless Metropolitan Area Network) through a base station, and the Internet using a communication protocol, such as a TCP/IP (Transmission Control Protocol/Internet Protocol), but the present application is not limited thereto. The "connection" according to the embodiment means a state where communication is enabled between the apparatuses (or making communication enabled between the apparatuses).

Further, the information processing apparatus 200 and the information processing terminal 300 can communicate with each other in a non-contact manner using a magnetic field (hereinafter, referred to as a "carrier") that has a specific frequency of, for example, 13.56 MHz.

[Outline of a Managing Apparatus 100]

The managing apparatus 100 manages a communication unit (that is, a communication unit that realizes a reader/writer function, and hereinafter, the communication unit is referred to as a "first communication unit") that the information processing apparatus 200 includes in order to communicate with the information processing terminal 300 in a non-contact manner or the reader/writer 290 that is connected to the information processing apparatus 200. Specifically, the managing apparatus 100 executes the following processes of (I) to (III), thereby managing the first communication unit that is included in the information processing apparatus 200 or the reader/writer 290 that is connected to the information processing apparatus 200. In the description below, the case where the managing apparatus 100 manages the first communication unit that is included in the information processing apparatus 200 will be exemplified.

(I) Process target determining Process

The managing apparatus 100 determines whether the first communication unit included in the information processing apparatus 200 that performs communication is managed (the first communication unit is a management target that is managed by the managing apparatus). The managing apparatus 100 executes the process target determining process based on identification information that is transmitted from the information processing apparatus 200. In this case, the identification information is information for identifying the first communication unit that is included in the information processing apparatus 200 (or the reader/writer 290 that is connected to the information processing apparatus 200). The identification information may be exemplified by a unique ID (for example, a combination of a vendor ID and a serial number) assigned to the first communication unit, but the present application is not limited thereto.

More specifically, the managing apparatus 100 searches a management database (an example of third management information, which will be described in detail below) where identification information of the managed first communication unit is recorded, based on the identification information that is acquired from the information processing apparatus 200. In addition, when the first management information corresponding to the acquired identification information is recorded in the management database, the managing apparatus 100 determines that the first communication unit corresponding to the acquired identification information is managed. Further, when the first management information corresponding to the acquired identification information is not recorded in the management database, the managing apparatus 100 determines that the first communication unit corresponding to the acquired identification information is not managed. In this case, the first management information is information indicating that the first communication unit of the information processing apparatus 200 is managed. In the description below, the first management information may be referred to as an "AC (Activation Code)".

Accordingly, the managing apparatus 100 can determine whether the first communication unit that becomes the process target is managed, based on the acquired identification information.

(II) Management Information Deriving Process

If the process target is determined during the process of (I), the managing apparatus 100 derives the first management information or the second management information in accordance with the determination result. Specifically, the managing apparatus 100 derives the first management information when it is determined that the first communication unit becoming the process target is not managed, and derives the second management information when it is determined that the first communication unit becoming the process target is managed.

In this case, the second management information is information for managing a service process between the first communication unit in the information processing apparatus 200 and the information processing terminal 300. Further, examples of the service process between the first communication unit and the information processing terminal 300 may include a read process of service data, such as electronic money or points, which is related to services that are stored in the information processing terminal 300, and a write process with respect to the service data, but the present application is not limited thereto. In the description below, the second management information may be referred to as an "SPC (Service Provider Code)".

Figure 2:
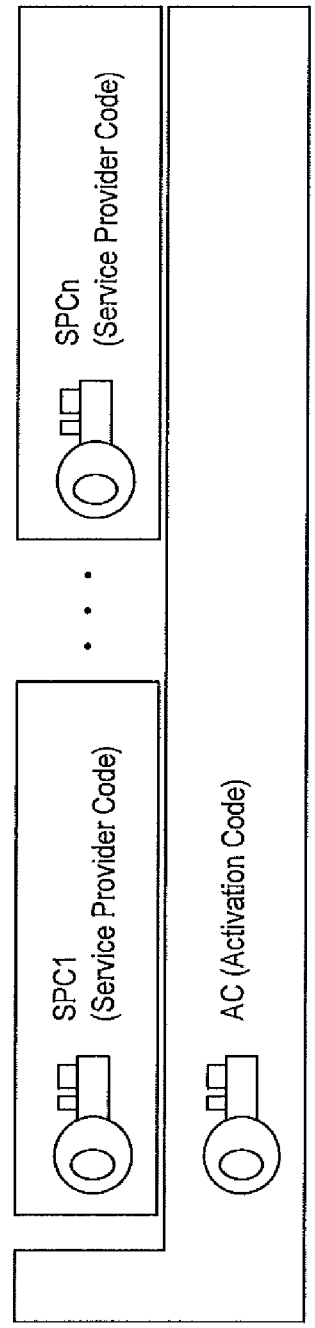
FIG. 2 is a diagram illustrating a relationship between first management information (AC) and second management information (SPC) in a managing apparatus according to an embodiment.

FIG. 2 is a diagram illustrating a relationship between first management information (AC) and second management information (SPC) in a managing apparatus 100 according to an embodiment. As shown in FIG. 2, the managing apparatus 100 associates one or more second management information (SPC) with the first management information (AC), thereby managing the first communication unit that is included in the information processing apparatus 200.

As shown in FIG. 2, the managing apparatus 100 manages the first communication unit, thereby setting an authority to perform a service corresponding to the second management information (SPC) with respect to the information processing apparatus 200 where the first management information (AC) exists, that is, the information processing apparatus 200 that is managed by the managing apparatus.

Further, the managing apparatus 100 sets the second management information (SPC) for each service, as shown in FIG. 2. Accordingly, the managing apparatus 100 can individually manage various services that the information processing apparatus 200 enjoys using the information processing terminal 300.

More specifically, the managing apparatus 100 uses a management database (third management information, which may be hereinafter referred to as a "management DB") where the identification information, the first management information (AC), and the second management information (SPC) for each service are associated with each other and recorded, thereby individually managing various services that the information processing apparatus 200 enjoys using the information processing terminal 300.

FIG. 3 is a diagram illustrating an example of a management database according to an embodiment. Referring to FIG. 3, it can be seen that items of an "RW-ID", an "Activation Code" (hereinafter, referred to as "AC"), and three "Service Provider Codes" (hereinafter, referred to as "SPC") are exemplified.

The "RW-ID" that is an ID for identifying the first communication unit included in the information processing apparatus 200 corresponds to identification information. The "AC" indicates the first management information, and each "SPC" indicates the second management information for every service.

In this case, FIG. 3 shows the case where a first communication unit corresponding to reference numeral 16 is not managed by a managing apparatus 100. FIG. 3 shows the case where a first communication unit corresponding to reference numeral 10 is allowed to execute a service corresponding to "SPC#1". In the same way, FIG. 3 shows the case where a first communication unit corresponding to reference numeral 12 is allowed to execute services corresponding to "SPC#1", "SPC#2", and "SPC#3", and a first communication unit corresponding to reference numeral 14 is allowed to execute a service corresponding to "SPC#2".

FIG. 3 shows an example of when values of "AC" and "SPC" are masked, however, it is needless to say that the present application is not limited thereto. FIG. 3 shows an example of when a management database corresponds to three services, but the present application is not limited thereto. The management database can be configured such that managing apparatus 100 corresponds to services of the arbitrary number.

The managing apparatus 100 can use the management database shown in FIG. 3 to determine whether the first communication unit included in the individual information processing apparatus 200 is managed and individually manage various services that the information processing apparatus 200 enjoys using the information processing terminal 300.

Next, the description is given to each of an example of a method of deriving first management information (AC) according to the embodiment and an example of a method of deriving second management information (SPC) according to the embodiment.

[Method of Deriving First Management Information (AC)]

Figure 4:
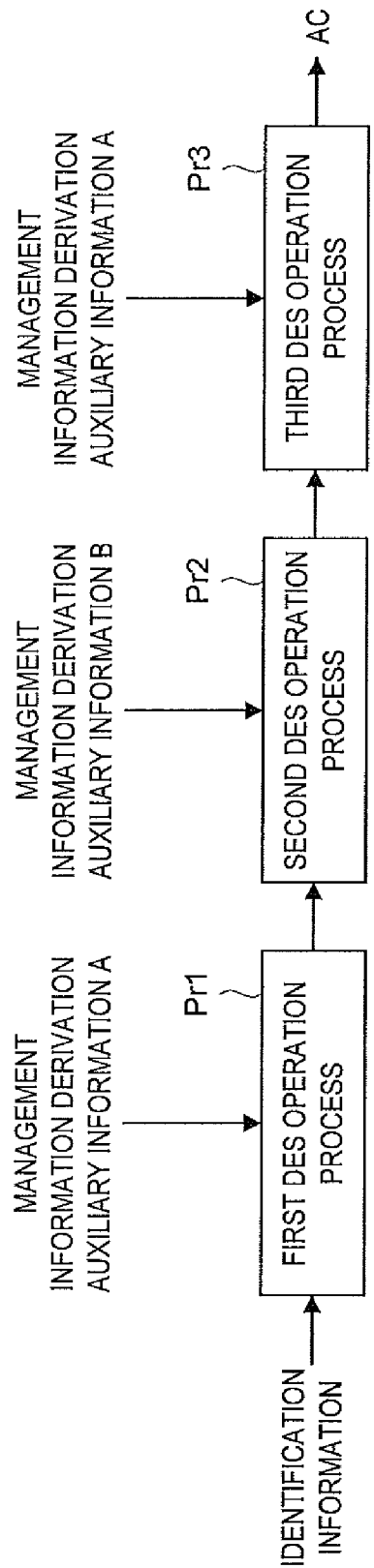
FIG. 4 is a diagram illustrating an example of a method of deriving first management information (AC) in a managing apparatus according to an embodiment.

First, the method of deriving the first management information (AC) will be described. FIG. 4 is a diagram illustrating an example of a method of deriving first management information (AC) in a managing apparatus 100 according to an embodiment.

As shown in FIG. 4, the managing apparatus 100 performs a DES (Data Encryption Standard) operation on the identification information that is acquired from the information processing apparatus 200, thereby deriving the first management information (AC). In this case, FIG. 4 shows an example of when the managing apparatus 100 performs three DES operations including a first DES operation process Pr1 to a third DES operation process Pr3. Further, management information derivation auxiliary information A and management information derivation auxiliary information B that are shown in FIG. 4 show common keys that are used to perform the DES operations, respectively. As shown in FIG. 4, the managing apparatus 100 derives the first management information (AC) based on the identification information that is acquired from the information processing apparatus 200, thereby individually managing the information processing apparatuses 200 that constitute the information processing system 1000.

The method of deriving the first management information (AC) according to the embodiment is not limited to the above example. For example, the managing apparatus 100 can derive the first management information (AC) using an AES (Advanced Encryption Standard) as another encryption scheme, or use the identification information as the first management information (AC) as it is.

[Method of Deriving Second Management Information (SPC)]

Figure 5:
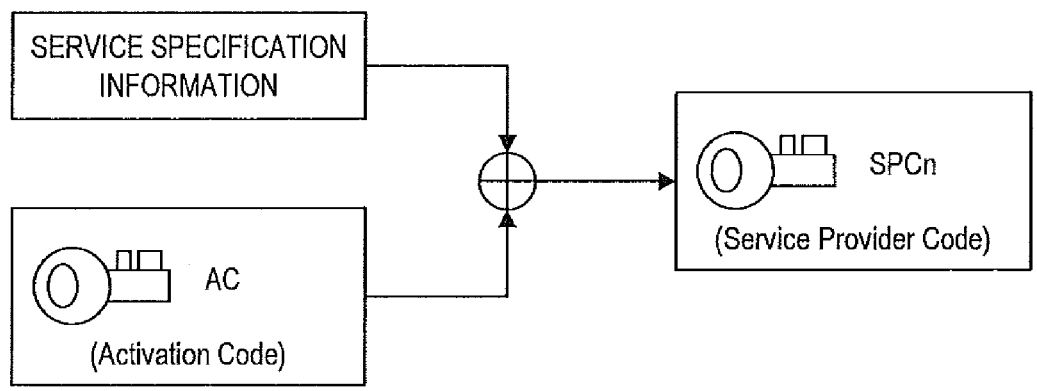
FIG. 5 is a diagram illustrating an example of a method of deriving second management information (SPC) in a managing apparatus according to an embodiment.

Next, a method of deriving second management information (SPC) will be described. FIG. 5 is a diagram illustrating an example of a method of deriving second management information (SPC) in a managing apparatus 100 according to an embodiment.

As shown in FIG. 5, the managing apparatus 100 performs an XOR (eXclusive OR) operation based on the first management information (AC) and service specification information. In this case, the service specification information is information that the information processing terminal 300 uses to identify a corresponding service, and is transmitted from the information processing apparatus 200, similar to the identification information. Further, the service specification information is generated by the information processing apparatus 200, based on the first information and the second information that are stored in the information processing terminal 300. The first information is information indicating a system that the information processing terminal 300 corresponds. In addition, the first information may be exemplified by a system code. The second information is information indicating a service that the information processing terminal 300 corresponds. In addition, the second information may be exemplified by a service code.

Figure 6:
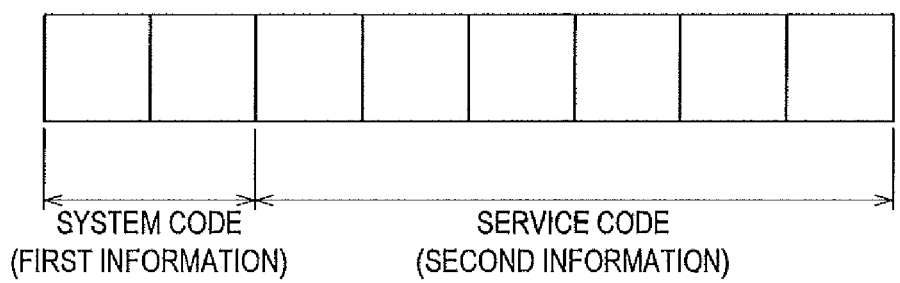
FIG. 6 is a diagram illustrating an example of service specification information according to an embodiment.

FIG. 6 is a diagram illustrating an example of service specification information according to an embodiment. As shown in FIG. 6, the service specification information is generated by integrating a system code (an example of the first information) and a service code (an example of the second information) as one code. The configuration of the service specification information according to the embodiment is not limited to the configuration shown in FIG. 6. For example, an arrangement relationship between the system code (an example of the first information) and the service code (an example of the second information) may be inversed.

The managing apparatus 100 can use the deriving method shown in FIG. 5, thereby generating the second management information (SPC) associated with the first management information (AC) for every service, as shown in FIG. 2. Further, it is needless to say that the method of deriving the second management information (SPC) according to the embodiment is not limited to the above example.

In accordance with the determined result in the process of (I), the managing apparatus 100 derives the first management information (AC) or the second management information (SPC), as described above.

(III) Execution of a Process Based on Transmission of Management Information and a Response from an Information Processing Apparatus 200

The managing apparatus 100 transmits the first management information or the second management information derived in the process of (II) to the information processing apparatus 200 that corresponds to the received identification information and service specification information. Further, the managing apparatus 100 determines a process authority, based on a process result that is transmitted from the information processing apparatus 200 in accordance with the transmitted management information (first management information or second management information). In addition, the managing apparatus 100 executes a process based on a response from the information processing apparatus 200, in accordance with the determined result. In this case, the process result that is transmitted from the information processing apparatus 200 may be exemplified by a setting notification or an apparatus-side determination result.

The setting notification is information indicating whether the information processing apparatus 200 sets the first management information (AC). Examples of the setting notification may include "a notification indicating that the information processing apparatus 200 sets the first management information (AC)" (hereinafter, referred to as "first setting notification" and "a notification indicating that the information processing apparatus 200 does not set the first management information (AC)" (hereinafter, referred to as "second setting notification").

Further, the apparatus-side determination result is information indicating whether the management information (first management information or second management information) transmitted by the managing apparatus 100 and the first management information stored by the information processing apparatus 200 or the derived second management information are equal to each other. Examples of the apparatus-side determination result may include a first apparatus-side determination result, a second apparatus-side determination result, and a third apparatus-side determination result. The first apparatus-side determination result is "information indicating that the first management information (AC) transmitted by the managing apparatus 100 and the first management information (AC) stored by the information processing apparatus 200 are equal to each other". The second apparatus-side determination result is "information indicating that the second management information (SPC) transmitted by the managing apparatus 100 and the second management information (SPC) stored by the information processing apparatus 200 are equal to each other. In addition, the third apparatus-side determination result is "information indicating that the second management information (SPC) transmitted by the managing apparatus 100 and the second management information (SPC) stored by the information processing apparatus 200 are not equal to each other".

[III-1] Case Where First Management Information (AC) is Transmitted

When the managing apparatus 100 transmits the first management information (AC), the managing apparatus 100 executes the following processes, based on the setting notification transmitted from the information processing apparatus 200 or the apparatus-side determination result.

[III-1-1] First Process Based on a Response from an Information Processing Apparatus 200

When the managing apparatus 100 receives the first setting notification or the first apparatus-side determination result, the managing apparatus 100 executes a managing process that manages the first communication unit of the corresponding information processing apparatus 200. For example, the managing apparatus 100 records the derived first management information (AC) in the management database (for example, management database shown in FIG. 3), thereby executing the managing process. However, the present application is not limited thereto.

As shown in FIG. 2, the managing apparatus 100 manages services that are provided to the information processing apparatus 200, based on the first management information (AC). Further, as described above, when the first management information (AC) is recorded in the management database, the managing apparatus 100 derives the second management information (SPC) in the process of (II) (derivation of management information). Accordingly, in the above case, the managing apparatus 100 allows the information processing apparatus 200 to enjoy services using the information processing terminal 300.

[III-1-2] Second Process Based on a Response from an Information Processing Apparatus 200

When the managing apparatus 100 receives the second setting notification, the managing apparatus 100 does not execute a managing process that manages the first communication unit of the corresponding information processing apparatus 200. Specifically, the managing apparatus 100 does not record the derived first management information (AC) in the management database (for example, management database shown in FIG. 3). In this case, as shown in FIG. 2, the managing apparatus 100 manages a service that is provided to the information processing apparatus 200, based on the first management information (AC). Accordingly, in the above case, the information processing apparatus 200 may not enjoy a service using the information processing terminal 300.

[0065]
[III-2] Case Where Second Management Information (SPC) is Transmitted

When the managing apparatus 100 transmits the second management information (SPC), the managing apparatus 100 determines a process authority with respect to the information processing apparatus 200 using the following processes, based on the apparatus-side determination result that is transmitted from the information processing apparatus 200.

[0066]
[III-2-1] Third Process Based on a Response from an Information Processing Apparatus 200

When the managing apparatus 100 receives the second apparatus-side determination result, the managing apparatus 100 determines that it is possible to execute a service corresponding to the second management information (SPC) derived by the managing apparatus 100. In addition, the managing apparatus 100 allows the service corresponding to the derived second management information (SPC) to be executed, and executes a service process according to the corresponding service. Further, the managing apparatus 100 records the derived second management information (SPC) in the management database (for example, management database shown in FIG. 3). Accordingly, in the above case, the information processing apparatus 200 can enjoy a service using the information processing terminal 300.

[III-2-2] Fourth Process Based on a Response from an Information Processing Apparatus 200

When the managing apparatus 100 receives the third apparatus-side determination result, the managing apparatus 100 determines that it may not possible to execute a service corresponding to the second management information (SPC) derived by the managing apparatus 100. In addition, the managing apparatus 100 does not allow the service corresponding to the derived second management information (SPC) to be executed. Accordingly, in the above case, the information processing apparatus 200 may not enjoy a service using the information processing terminal 300.

[0068]
As such, the managing apparatus 100 determines the process authority with respect to the information processing apparatus 200, based on the transmitted management information (first management information or second management information) and the response (for example, the setting notification or the apparatus-side determination result) transmitted from the information processing apparatus 200 in accordance with the corresponding management information. In addition, the managing apparatus 100 selectively executes a service process based on the determined result.

Further, the managing apparatus 100 selectively records the management information (first management information or second management information) derived during the process of (II) in the management database (for example, management database shown in FIG. 3) in accordance with the executed process. Accordingly, the managing apparatus 100 can manage the first management information (AC) and the second management information (SPC) by associating the first management information and the second management information, as shown in FIG. 2.

The managing apparatus 100 executes the process of (I) (process target determining process), the process of (II) (management information deriving process), and the process of (III) (process based on the transmission of the management information and the response from the information processing apparatus 200), thereby individually managing various services that the information processing apparatus 200 enjoys using the information processing terminal 300.

Further, the managing apparatus 100 provides to the information processing apparatus 200 an encryption key that is needed to have access to an internal memory (not shown) where an access of the information processing terminal 300 is restricted. In this case, the encryption key is held in a security module 190, and the managing apparatus 100 provides the encryption key held in the security module 190 to the information processing apparatus 200 in accordance with a request from the information processing apparatus 200. In FIG. 1, the security module 190 is shown to be separated from the managing apparatus 100, but the managing apparatus 100 can include the security module 190 in the managing apparatus 100.

Further, the managing apparatus 100 can executes a service process on services using the information processing terminal 300, between each information processing apparatus 200 and the managing apparatus 100. Examples of the service process that is executed by the managing apparatus 100 may include a settlement process using service data related to services stored in the information processing terminal 300, for example, electronic money, points, or coupons, but the present application is not limited thereto. The managing apparatus 100 selectively executes a plurality of service processes in accordance with the kind of electronic money, thereby allowing a user of the information processing apparatus 200 to enjoy various services using the information processing terminal 300 that stores service data related to services.

Although not shown in FIG. 1, the information processing system according to an embodiment may further have a service managing apparatus (not shown) that executes a service process, for each service. In this case, the managing apparatus 100 uses a redirection to connect the information processing apparatus 200 to the service managing apparatus corresponding to a service using the information processing terminal 300. Accordingly, even when the information processing system according to an embodiment further has the service managing apparatus (not shown), a user of the information processing apparatus 200 can enjoy various services using the information processing terminal 300 that stores service data related to a service.

[Outline of an Information Processing Apparatus 200]

The information processing apparatus 200 communicates with the managing apparatus 100 and each information processing terminal 300, thereby enjoying a service (for example, a settlement service using electronic money) using the information processing terminal 300 provided by the managing apparatus 100. Specifically, the information processing apparatus 200 executes the following processes of (i) and (ii), thereby enjoying a service using the information processing terminal 300.

(i) Transmission of Information to a Managing Apparatus 100

The information processing apparatus 200 acquires the first information indicating a corresponding system and the second information indicating a corresponding service from the information processing terminal 300, and generates service specification information for the information processing terminal 300 to identify the corresponding service, based on the first information and the second information.

In this case, the information processing apparatus 200 communicates with the information processing terminal 300 using a first communication path, thereby acquiring the first information and the second information. Examples of the first communication path may include a communication path formed by an NFC (Near Field Communication) that uses a carrier at a specific frequency, such as 13.56 MHz, for communication. The information processing apparatus 200 uses the first communication path to communicate with the information processing terminal 300 through an ASK (Amplitude Shift Keying) modulation. Accordingly, the information processing apparatus 200 transmits a read command to the information processing terminal 300 to acquire the first information or the second information, and transmits a write command to the information processing terminal 300 to update values of electronic money (an example of service data) in the information processing terminal 300.

If the service specification information is generated, the information processing apparatus 200 transmits the generated service specification information and the identification information to the managing apparatus 100.

In this case, the service specification information and the identification information are transmitted using the second communication path that is connected to the managing apparatus 100 through the network 500 (or directly). That is, the information processing apparatus 200 communicates with an external device using the first communication path that communicates with the information processing terminal 300 and the second communication path (communication path that is different from the first communication path) that communicates with the managing apparatus 100. As such, if the information processing apparatus 200 communicates with the external device using the two communication paths, the information processing apparatus 200 can enjoy various services provided by the managing apparatus 100, using the information processing terminal 300 that stores service data related to the services. In the description below, the communication unit of the information processing apparatus 200 that performs communication using the second communication path is referred to as a "second communication unit".

Further, the identification information that is transmitted by the information processing apparatus 200 is stored in a storage unit, such as a ROM (Read Only Memory), which is included in the first communication unit, and the information processing apparatus 200 can appropriately read out the identification information from the corresponding storage unit. However, the present application is not limited thereto. For example, the identification information may be stored in a storage unit included in the information processing apparatus 200, and the information processing apparatus 200 may read out the identification information from the corresponding storage unit.

(ii) Process Based on Received Management Information

The information processing apparatus 200 receives the management information (first management information or second management information) transmitted from the managing apparatus 100, based on the service specification information and the identification information transmitted during the process of (i). In addition, if the management information is received, the information processing apparatus 200 executes the following processes of [ii-1] to [ii-4].

[ii-1] Setting Determining Process of First Management Information (AC)

The information processing apparatus 200 determines whether the first management information (AC) is set to the information processing apparatus 200. The process of [ii-1] corresponds to a process that determines whether the first communication unit of the information processing apparatus 200 is managed by the managing apparatus 100. In this case, the information processing apparatus 200 can execute the determining process in accordance with a value of a setting flag that is stored in the storage unit and indicates whether the first management information (AC) is set. In the setting flag, for example, whether the first management information is set is represented by one bit, but the present application is not limited thereto. Further, the information processing apparatus 200 may execute the determining process by determining whether the first management information (AC) is stored in the storage unit.

When it is determined that the first management information (AC) is not set, the information processing apparatus 200 sets the received management information as the first management information (AC). In addition, the information processing apparatus 200 transmits a setting result of the first management information (AC) as a setting notification (a first setting notification or a second setting notification) to the managing apparatus 100. In this case, the information processing apparatus 200 may transmit the setting flag, which is stored in the storage unit of the information processing apparatus 200, as the setting notification.

Meanwhile, when it is determined that the first management information (AC) is set, the information processing apparatus 200 executes the following process of [ii-2].

[ii-2] First Determining Process of Received Management Information

The information processing apparatus 200 compares the received management information and the set first management information (AC).

As the comparison result, when it is determined that the received management information and the set first management information (AC) are equal to each other, the information processing apparatus 200 transmits a first apparatus-side determination result, which indicates that the received management information and the set first management information (AC) are equal to each other, to the managing apparatus 100.

Further, as the comparison result, when it is determined that the received management information and the set first management information (AC) are not equal to each other, the information processing apparatus 200 executes the following process of [ii-3].

[ii-3] Derivation of Second Management Information (SPC)

The information processing apparatus 200 derives the second management information (SPC), based on the set first management information (AC) and the service specification information generated during the process of (i). In this case, similar to the managing apparatus 100, the information processing apparatus 200 derives the second management information (SPC) using the deriving method shown in FIG. 5. That is, when the first management information (AC) set to the information processing apparatus 200 and the first management information (AC) stored in the managing apparatus 100 are equal to each other, the second management information (SPC) that is derived by the information processing apparatus 200 becomes equal to the second management information (SPC) that is derived by the managing apparatus 100.

[ii-4] Second Determining Process of Received Management Information

If the second management information (SPC) is derived by the process of (ii-3), the information processing apparatus 200 compares the received management information and the derived second management information (SPC).

As the comparison result, when the received management information and the derived second management information (SPC) are equal to each other, the information processing apparatus 200 transmits a second apparatus-side determination result, which indicates that the received management information and the derived second management information (SPC) are equal to each other, to the managing apparatus 100. This case indicates the case where the first communication unit of the information processing apparatus 200 is managed by the managing apparatus 100, and a service corresponding to the derived second management information (SPC) is allowed. Accordingly, the information processing apparatus 200 executes a service process that is related to a service corresponding to the second management information (SPC) using the information processing terminal 300.

Further, as the comparison result, when it is determined that the received management information and the derived second management information (SPC) are not equal to each other, the information processing apparatus 200 transmits a second apparatus-side determination result, which indicates that the received management information and the derived second management information (SPC) are not equal to each other, to the managing apparatus 100. In this case, the managing apparatus 100 does not allow a service corresponding to the derived second management information (SPC) to be executed, as shown in [III-2-2]. Accordingly, the information processing apparatus 200 does not execute a service process that is related to a service corresponding to the second management information (SPC) using the information processing terminal 300.

The information processing apparatus 200 executes the process of (i) (transmission of information to the managing apparatus 100) and the process of (ii) (process based on the received management information), thereby enjoying a service using the information processing terminal 300 while using the first communication unit managed by the managing apparatus 100.

[Outline of an Information Processing Terminal 300]

The information processing terminal 300 includes a tamper-resistant IC chip, and stores the first information such as a system code, the second information such as a service code or service data such as values of electronic money in an internal memory of the corresponding IC chip. Further, the information processing terminal 300 communicates with the information processing apparatus 200 through the first communication path, and executes various processes based on various requests or various commands transmitted from the information processing apparatus 200. For example, when requests to acquire the first information and the second information are transmitted from the information processing apparatus 200, the information processing terminal 300 transmits the first information and the second information to the information processing apparatus 200 in accordance with the corresponding acquisition command. For example, when an update command of values of electronic money is transmitted from the information processing apparatus 200, the information processing terminal 300 updates the stored values of the electronic money based on the update command, and transmits the process result to the information processing apparatus 200.

In this case, the information processing terminal 300 receives a carrier transmitted from the first communication unit of the information processing apparatus 200 using an antenna. In addition, the information processing terminal 300 demodulates an alternating current component of an induced voltage that is generated by electromagnetic induction when a carrier (for example, a magnetic field having a predetermined frequency) transmitted from the first communication unit passes through the antenna, thereby extracting data (various requests or various commands) that is transmitted from the first communication unit. Further, the information processing terminal 300 can be driven by acquiring power from a direct current component of the induced voltage.

Further, the information processing terminal 300 performs a load modulation to generate a demagnetizing field with respect to the carrier from the antenna, thereby performing a response. In addition, the information processing apparatus 200 detects a change in impedance of the information processing terminal 300 when viewed from the first communication unit (so-called reader/writer), which is generated by the load modulation, as a response signal from the information processing terminal 300.

As described above, the information processing terminal 300 communicates with the information processing apparatus 200 and can securely execute various processes based on various commands that are transmitted from the information processing apparatus 200, such as a read operation or an update operation on data where alteration of data, such as electronic money, becomes an issue.

In the information processing system 1000 according to the embodiment, each of the managing apparatus 100, the information processing apparatus 200, and the information processing terminal 300 executes the above-described processes. Accordingly, it is possible to realize the information processing system 1000 where the managing apparatus 100 can individually manage various services that the information processing apparatus 200 enjoys using the information processing terminal 300 that stores service data related to a service.

(Example of a Process in an Information Processing System According to an Embodiment)

In the above case, the outline of each of the managing apparatus 100, the information processing apparatus 200, and the information processing terminal 300, which constitute the information processing system 1000, has been described. Next, an overall process flow of the information processing system 1000 that includes the managing apparatus 100, the information processing apparatus 200, and the information processing terminal 300 will be described. In the description below, as the processes in the information processing system 1000, the two cases, that is, [1] the case where the first management information (AC) is not set to the managing apparatus 100 and [2] the case where the first management information (AC) is set to the managing apparatus 100 are exemplified.

[1] FIRST EXAMPLE

Case Where First Management Information (AC) is not Set to the Managing Apparatus 100

Figure 7:
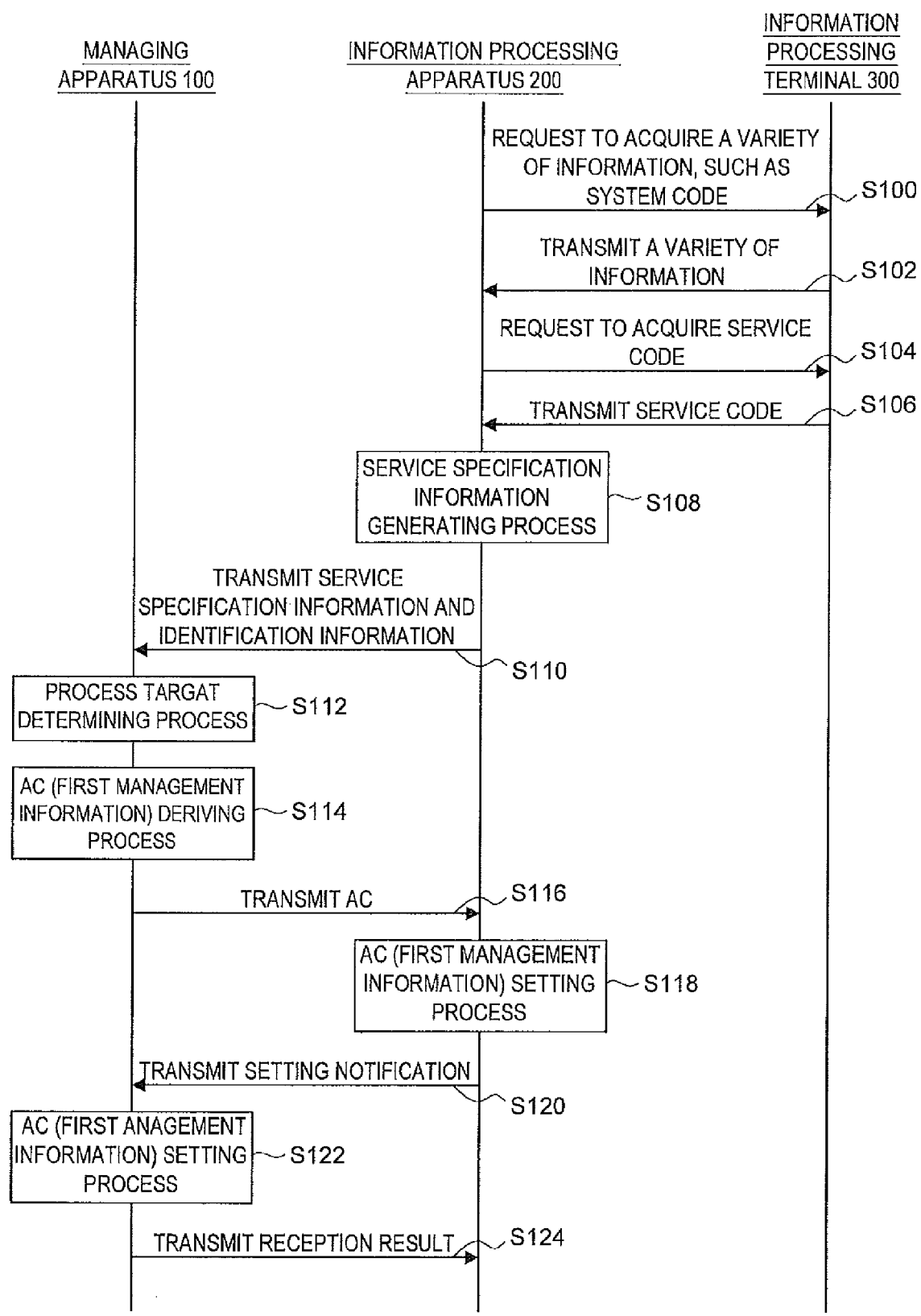
FIG. 7 is a diagram illustrating a first example of a process in an information processing system according to an embodiment.

FIG. 7 is a diagram illustrating a first example of a process in an information processing system 1000 according to an embodiment. FIG. 7 shows an example of a process in the case where the first management information (AC) is not set to the managing apparatus 100. FIG. 7 shows a flow of a process after the information processing apparatus 200 captures the information processing terminal 300 by polling.

The information processing apparatus 200 transmits an acquisition request of a variety of information, such as a system code (an example of the first information) (S100). In addition, the information processing terminal 300 transmits information according to the acquisition request transmitted in Step S100 to the information processing apparatus 200 (S102). In this case, the information processing apparatus 200 may acquire information, such as an ID of an IC chip that is included in the information processing terminal 300, in addition to the system code (an example of the first information), in Step S100. However, the present application is not limited thereto.

In Step S102, if the system code (an example of the first information) is received, the information processing apparatus 200 transmits an acquisition request of a service code (an example of the second information) to the information processing terminal 300 (S104). In addition, the information processing terminal 300 transmits the service code (an example of the second information) to the information processing apparatus 200 in accordance with the acquisition request transmitted in Step S104 (S106).

In FIG. 7, the information processing apparatus 200 separates the acquisition request of the system code (an example of the first information) and the acquisition request of the service code (an example of the second information) from each other and transmits the acquisition requests to the information processing terminal 300, but the present application is not limited thereto. For example, the information processing apparatus 200 may transmit the acquisition request of Step S100 and the acquisition request of Step S104 as one acquisition request to the information processing terminal 300.

If the service code (an example of the second information) that is transmitted in Step S106 is received, the information processing apparatus 200 generates service specification information, based on the system code (an example of the first information) and the service code (an example of the second information) acquired from the information processing terminal 300 (S108; a service specification information generating process). In this case, the information processing apparatus 200 can combine the system code and the service code with each other to generate the service specification information, as shown in FIG. 6.

In Step S108, if the service specification information is generated, the information processing apparatus 200 transmits the generated service specification information and the identification information to the managing apparatus 100 (S110).

In Step S110, if the transmitted service specification information and identification information are received, the managing apparatus 100 determines whether the first communication unit of the information processing apparatus 200 is managed, based on the received identification information (S112; a process target determining process). In this case, the managing apparatus 100 searches a management database based on the received identification information and determines whether the first management information (AC) is set to the management database, thereby executing a process of Step S112.

In this case, as described above, FIG. 7 shows the case where the first management information (AC) is not set to a managing apparatus 100. This case means that the first communication unit of the information processing apparatus 200 is not managed by the managing apparatus 100.

In Step S112, when it is determined that the first communication unit of the information processing apparatus 200 is not managed, the managing apparatus 100 derives the first management information (AC) based on the identification information received in Step S110 (S114: an AC deriving process). In this case, the managing apparatus 100 can use the deriving method shown in FIG. 4 to derive the first management information (AC).

In Step S114, if the first management information (AC) is derived, the managing apparatus 100 transmits the first management information (AC) to the information processing apparatus 200 (S116).

In Step S116, if the transmitted first management information (AC) is received, the information processing apparatus 200 sets the received first management information (AC) (S118; an AC setting process). In this case, the information processing apparatus 200 can execute the process of [ii-1] as the process of Step S118.

If the process of Step S118 is executed, the information processing apparatus 200 transmits a setting notification (a first setting notification or a second setting notification) according to a process result of Step S118 to the managing apparatus 100 (S120).

In Step S120, if the transmitted setting notification is received, the managing apparatus 100 selectively sets the first management information (AC) derived in Step S114, based on the received setting notification (S122; AC setting process). In this case, the managing apparatus 100 can execute the process of [III-1] as Step S122. In addition, the managing apparatus 100 transmits the process result of Step S122 as the reception result with respect to the setting notification received in Step S120 to the information processing apparatus 200 (S124).

If the process shown in FIG. 7 is executed, the managing apparatus 100 can manage the first communication unit of the information processing apparatus 200 where the first management information (AC) is not set, that is, the non-managed first communication unit.

[2] SECOND EXAMPLE

Case Where First Management Information (AC) is Set to a Managing Apparatus 100

Figure 8:
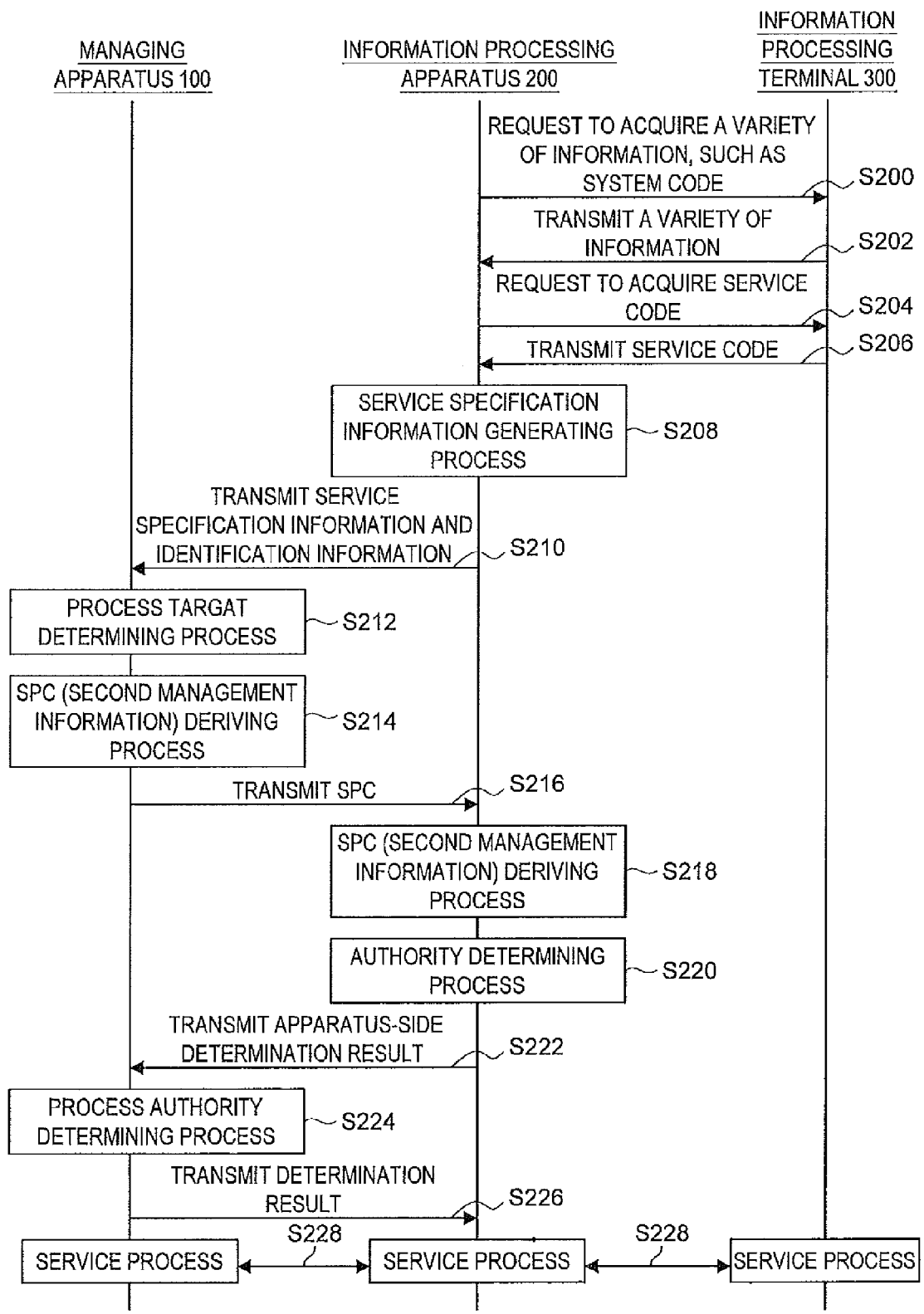
FIG. 8 is a diagram illustrating a second example of a process in an information processing system according to an embodiment.

FIG. 8 is a diagram illustrating a second example of a process in an information processing system 1000 according to an embodiment. FIG. 8 shows an example of a process in the case where the first management information (AC) is set to the managing apparatus 100. FIG. 8 shows a flow of a process that is executed after the information processing apparatus 200 captures the information processing terminal 300 by polling.

The information processing apparatus 200 transmits an acquisition request of a variety of information, such as a system code (an example of first information) (S200), similar to Step S100 of FIG. 7. In addition, the information processing terminal 300 transmits information according to the acquisition request transmitted in Step S200 to the information processing apparatus 200 (S202), similar to Step S102 of FIG. 7.

In Step S202, if the system code (an example of the first information) is received, the information processing apparatus 200 transmits an acquisition request of a service code (an example of second information) to the information processing terminal 300 (S204), similar to Step S104 of FIG. 7. In addition, the information processing terminal 300 transmits the service code (an example of the second information) to the information processing apparatus 200 in accordance with the acquisition request transmitted in Step S204 (S206), similar to Step S106 of FIG. 7.

In Step S206, if the transmitted service code (an example of the second information) is received, the information processing apparatus 200 generates service specification information, based on the system code (an example of the first information) and the service code (an example of the second information) acquired from the information processing terminal 300, similar to Step S108 of FIG. 7 (S208; a service specification information generating process).

In Step S208, if the service specification information is generated, the information processing apparatus 200 transmits the generated service specification information and the identification information to the managing apparatus 100 (S210), similar to Step S110 of FIG. 7.

In Step S210, if the transmitted service specification information and identification information are received, the managing apparatus 100 determines whether the first communication unit of the information processing apparatus 200 is managed, based on the received identification information (S212; a process target determining process), similar to Step S112 of FIG. 7.

In this case, as described above, FIG. 8 shows the case where the first management information (AC) is set to the managing apparatus 100. This case means that the first communication unit of the information processing apparatus 200 is managed by the managing apparatus 100.

In Step S212, when it is determined that the first communication unit of the information processing apparatus 200 is managed, the managing apparatus 100 derives the second management information (SPC), based on the first management information (AC) corresponding to the identification information received in Step S210 and the service specification information received in Step S210 (S214: an SPC deriving process). In this case, the managing apparatus 100 can use the deriving method shown in FIG. 5 to derive the second management information (SPC).

In Step S214, if the second management information (SPC) is derived, the managing apparatus 100 transmits the derived second management information (SPC) to the information processing apparatus 200 (S216).

In Step S216, if the transmitted second management information (SPC) is received, the information processing apparatus 200 derives the second management information (SPC), based on the set first management information (AC) and the service specification information generated in Step S208 (S218; an SPC deriving process). In this case, the information processing apparatus 200 uses the deriving method shown in FIG. 5 to derive the second management information (SPC), similar to Step S214 in the managing process 100.

In Step S218, if the second management information (SPC) is derived, the information processing apparatus 200 compares the second management information received in Step S216 and the second management information (SPC) derived in Step S218 (S220; an authority determining process). In addition, the information processing apparatus 200 transmits an apparatus-side determination result according to the comparison result in Step S220 to the managing apparatus 100 (S222). In this case, the information processing apparatus 200 can execute the process of [ii-4] as the processes of Steps S220 and S222.

In Step S222, if the transmitted apparatus-side determination result is received, the managing apparatus 100 determines a process authority with respect to the information processing apparatus, based on the received apparatus-side determination result (S224; a process authority determining process). In this case, the managing apparatus 100 can execute the process of [III-2] as the process of Step S224. In addition, the managing apparatus 100 transmits the determination result in Step S224 to the information processing apparatus 200 (S226).

In Step S226, if the transmitted determination result allows the execution of the service, the information processing apparatus 200 executes a service process related to a service using the information processing terminal 300, between each of the managing apparatus 100 and the information processing terminal 300 and the information processing apparatus 200 (S228).

Although not shown in FIG. 8, if the determination result transmitted in Step S226 does not allow the execution of the service, the information processing apparatus 200 may not execute the service process related to the service using the information processing terminal 300.

If the process shown in FIG. 8 is executed, it is possible to realize the information processing system 1000 where the managing apparatus 100 can individually manage various services that the information processing apparatus 200 enjoys using the information processing terminal 300 that stores service data related to a service.

In the information processing system 1000, as shown in FIG. 7 or 8, if the process is executed, the first communication unit that is included in the information processing apparatus 200 is managed by the managing apparatus 100. Further, in the information processing system 1000, as shown in FIG. 7 or 8, if the process is executed, various services that the information processing apparatus 200 enjoys using the information processing terminal 300 are individually managed by the managing apparatus 100.

(Configuration of an Information Processing System 1000)

Figure 9:
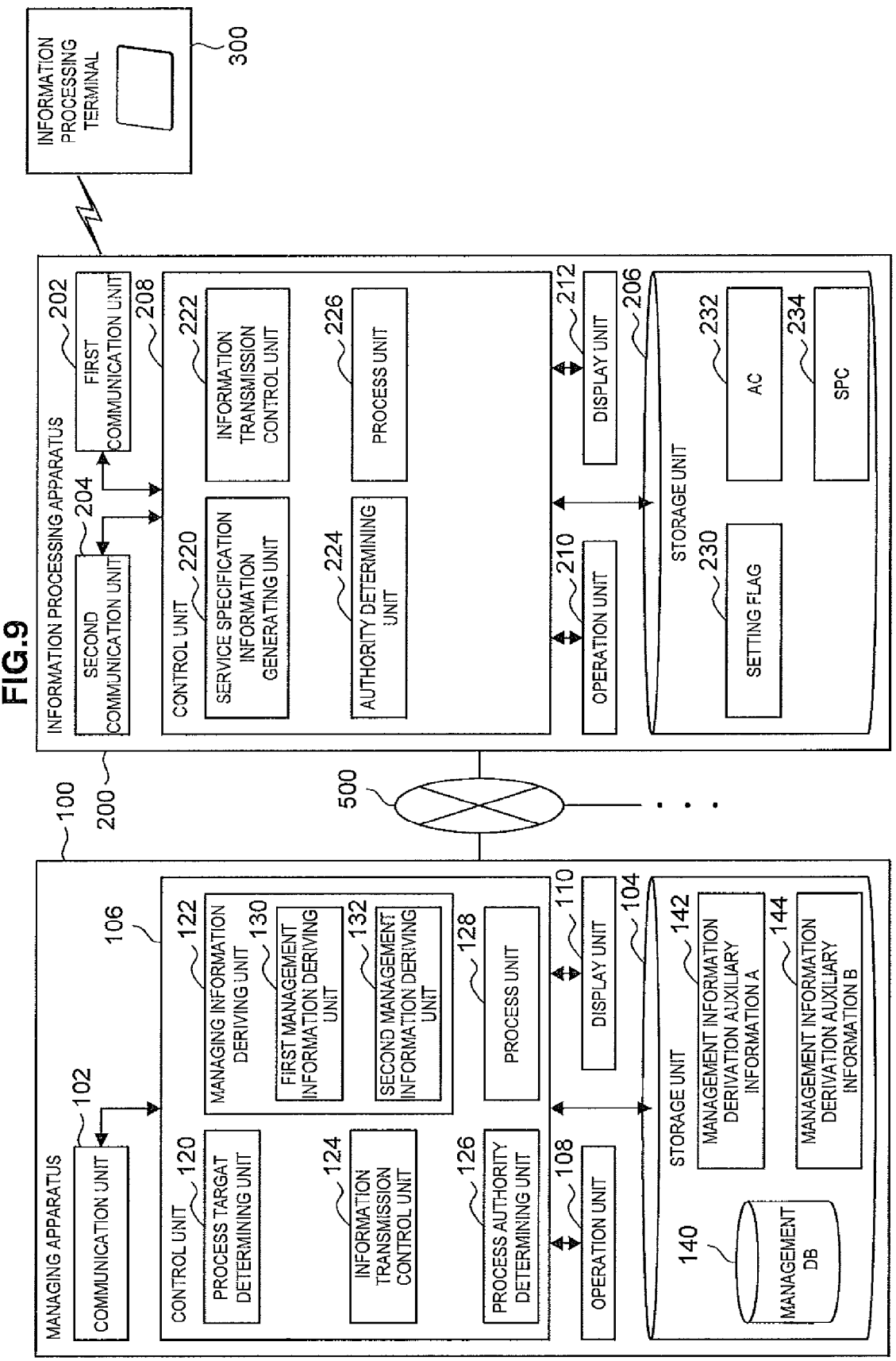
FIG. 9 is a diagram illustrating an example of the configuration of an information processing system according to an embodiment.

Next, each of the managing apparatus 100 and the information processing apparatus 200 that constitute the information processing system 1000 will be specifically described. FIG. 9 is a diagram illustrating an example of the configuration of an information processing system 1000 according to an embodiment. In this case, FIG. 9 shows a portion of the information processing system 1000 shown in FIG. 1. Specifically, FIG. 9 shows a managing apparatus 100, an information processing apparatus 200 that is connected to the managing apparatus 100 through a network 500, and an information processing terminal 300 that communicates with the information processing apparatus 200 in a non-contact manner.

[Managing Apparatus 100]

The managing apparatus 100 includes a communication unit 102 (management-side communication unit), a storage unit 104, a control unit 106, an operation unit 108, and a display unit 110.

Further, the managing apparatus 100 may include a ROM (Read Only Memory; not shown) where control data, such as a program or an operation parameter, which is used by the control unit 106, is recorded, and a RAM (Random Access Memory; not shown) that primarily stores a program executed by the control unit 106. The managing apparatus 100 connects the components through a bus that functions as a transmission path of data.

[Example of the Hardware Configuration of a Managing Apparatus 100]

Figure 10:
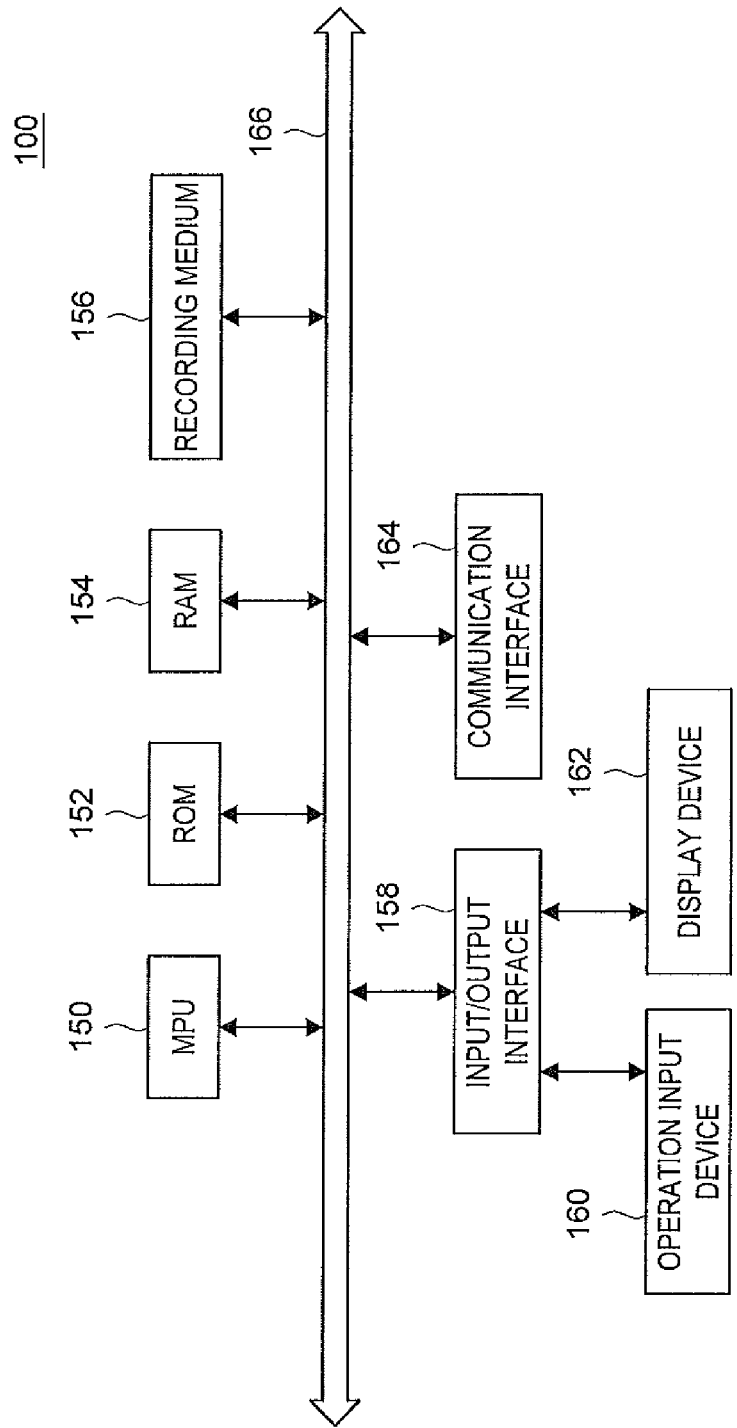
FIG. 10 is a diagram illustrating an example of the hardware configuration of a managing apparatus according to an embodiment.

FIG. 10 is a diagram illustrating an example of the hardware configuration of a managing apparatus 100 according to an embodiment. Referring to FIG. 10, the managing apparatus 100 includes an MPU 150, a ROM 152, a RAM 154, a recording medium 156, an input/output interface 158, an operation input device 160, a display device 162, and a communication interface 164. Further, the managing apparatus 100 connects the components through a bus 166 that functions as a transmission path of data.

The MPU 150 functions as the control unit 106 that controls the entire managing apparatus 100. Further, in the managing apparatus 100, the MPU 150 can function as a process target determining unit 120, a management information deriving unit 122, an information transmission control unit 124, a process authority determining unit 126, and a process unit 128, which will be described in detail below.

The ROM 152 stores control data, such as a program or an operation parameter, which is used by the MPU 150, and the RAM 154 primarily stores the program that is executed by the MPU 150.

The recording medium 156 functions as the storage unit 104, and stores the management database shown in FIG. 3, the management information derivation auxiliary information (auxiliary information for deriving the first management information) shown in FIG. 4, and an application. In this case, examples of the recording medium 156 may include a magnetic recording medium, such as a hard disk, and a nonvolatile memory, such as an EEPROM (Electrically Erasable and Programmable Read Only Memory), a flash memory, an MRAM (Magnetoresistive Random Access Memory), a FeRAM (Ferroelectric Random Access Memory), and a PRAM (Phase change Random Access Memory), but the present application is not limited thereto.

The input/output interface 158 connects the operation input device 160 or the display device 162. The operation input device 160 functions as the operation unit 108 and the display device 162 functions as the display unit 110. In this case, examples of the input/output interface 158 may include a USB (Universal Serial Bus) terminal, a DVI (Digital Visual Interface) terminal, and an HDMI (High-Definition Multimedia Interface) terminal, but the present application is not limited thereto. Further, the operation input device 160, which is a button, a directional key, a rotational selector such as a jog dial, or a combination thereof, is provided on the managing apparatus 100 and connected to the input/output interface 158 in the managing apparatus 100. Further, the display device 162, which is an LCD (Liquid Crystal Display) or an organic EL display (organic ElectroLuminescence display; it is also called an OLED display (Organic Light Emitting Diode display)), is provided on the managing apparatus 100 and connected to the input/output interface 158 in the managing apparatus 100. Further, it is needless to say that the input/output interface 158 can be connected to an operation input device (for example, a keyboard or a mouse) or a display device (for example, an external display) as an external device of the managing apparatus 100.

The communication interface 164 is a communication unit that is included in the managing apparatus 100, and functions as the communication unit 102 that performs wired/wireless communication with an external device, such as the information processing apparatus 200, through the network 500 (or directly). In this case, examples of the communication interface 164 may include a communication antenna and an RF circuit (wireless communication), an IEEE802.15.1 port and a transmitting/receiving circuit (wireless communication), an IEEE802.11b port and a transmitting/receiving circuit (wireless communication), and a LAN terminal and a transmitting/receiving circuit (wired communication), but the present application is not limited thereto. For example, the communication interface 164 may be configured to correspond to the network 500.

By the hardware configuration shown in FIG. 10, the managing apparatus 100 executes the process of (I) (process target determining process) to the process of (III) (process based on transmission of management information and a response from the information processing apparatus 200). Accordingly, the managing apparatus 100 can individually manage various services that the information processing apparatus 200 enjoys using the information processing terminal 300.

Referring back to FIG. 9, the configuration of the managing apparatus 100 will be described. The communication unit 102 is a communication unit that is included in the managing apparatus 100, and performs wired/wireless communication with an external device, such as the information processing apparatus 200, through the network 500 (or directly). Further, the communication of the communication unit 102 is controlled by the control unit 106.

The storage unit 104 is a storage unit that is included in the managing apparatus 100. The storage unit 104 stores, for example, the management database shown in FIG. 3, the management information derivation auxiliary information (auxiliary information for deriving the first management information) shown in FIG. 4, a derivation program that derives the second management information (SPC), and various applications. In this case, FIG. 9 shows an example of when the storage unit 104 stores a management DB 140, management information derivation auxiliary information A 142, and management information derivation auxiliary information B 144.

Further, examples of the storage unit 104 may include a magnetic recoding medium, such as a hard disk, and a nonvolatile memory, such as a flash memory, but the present application is not limited thereto.

The control unit 106 is composed of an MPU (Micro Processing Unit), and controls the entire managing apparatus 100. Further, the control unit 106 includes a process target determining unit 120, a management information deriving unit 122, an information transmission control unit 124, a process authority determining unit 126, and a processing unit 128.

The process target determining unit 120 executes the process of (I) (process target determining process), and determines whether the first communication unit of the information processing apparatus 200 corresponding to the identification information is managed (is a management target), based on the identification information that is received by the communication unit 102.

The managing information deriving unit 122 includes a first management information deriving unit 130 and a second management information deriving unit 132, and executes the process of (II) (management information deriving process).

When it is determined that the first communication unit (first communication unit of the information processing apparatus 200 corresponding to identification information), which becomes a process target in the process target determining unit 120, is not managed, the first management information deriving unit 130 derives the first management information (AC). In this case, the first management information deriving unit 130 uses the deriving method shown in FIG. 4 to derive the first management information (AC), but the present application is not limited thereto.

When it is determined that the first communication unit (first communication unit of the information processing apparatus 200 corresponding to identification information), which becomes a process target in the process target determining unit 120, is managed, the second management information deriving unit 132 derives the second management information (SPC). In this case, the second management information deriving unit 132 uses the deriving method shown in FIG. 5 to derive the second management information (SPC), but the present application is not limited thereto.

Accordingly, the management information deriving unit 122 can derive the first management information (AC) or the second management information (SPC) in accordance with the determination result in the process target determining unit 120. Further, the management information deriving unit 122 transmits the derived first management information (AC) or second management information (SPC) from the communication unit 102. In this case, the management information deriving unit 122 transmits the derived first management information (AC) or second management information (SPC) to the information transmission control unit 124, thereby transmitting the derived first management information (AC) or second management information (SPC) from the communication unit 102. Further, the management information deriving unit 122 can transmit the derived first management information (AC) or second management information (SPC) to the communication unit 102 without passing through the information transmission control unit 124.

The information transmission control unit 124 transmits a variety of information, such as the first management information (AC) or the second management information (SPC) derived by the management information deriving unit 122, to the information processing apparatus 200 that has transmitted the identification information and the service specification information. That is, the information transmission control unit 124 functions as a communication control unit in the managing apparatus 100.

The process authority determining unit 126 and the processing unit 128 execute the process of (III) (process based on the transmission of the management information and the response from the information processing apparatus 200). In this case, the process authority determining unit 126 determines a process authority based on the setting notification (first setting notification/second setting notification) received by the communication unit 102 or the apparatus-side determination result (first apparatus-side determination result/second apparatus-side determination result/third apparatus-side determination result). Further, the processing unit 128 executes a process in accordance with the determination result of the process authority determining unit 126.

The control unit 106 includes a process target determining unit 120, a management information deriving unit 122, an information transmission control unit 124, a process authority determining unit 126, and a processing unit 128, and can execute the processes of (I) to (III).

The operation unit 108 is an operation unit of the managing apparatus 100 that enables a predetermined operation by a user. The managing apparatus 100 includes the operation unit 108 and allows the managing apparatus 100 to perform an operation that a user of the managing apparatus 100 desires to perform. In this case, examples of the operation unit 108 may include an operation input device such as a keyboard or a mouse, a button, a directional key, a rotational selector such as a jog dial, and a combination thereof, but the present application is not limited thereto.

The display unit 110 is a display unit that is included in the managing apparatus 100, and displays a variety of information on a display screen. For example, an operation screen that allows the managing apparatus 100 to perform a desired operation or a screen that indicates a communication state with the individual information processing apparatus 200 may be displayed on the display screen of the display unit 110, but the present application is not limited thereto. In this case, the display unit 110 may include an LCD or an organic EL display, but the present application is not limited thereto.

By the above configuration, the managing apparatus 100 executes the process of (I) (process target determining process), the process of (II) (management information deriving process), and the process of (III) (process based on the transmission of the management information and the response from the information processing apparatus 200). Accordingly, by the above configuration, the managing apparatus 100 can individually manage various services that the information processing apparatus 200 enjoys using the information processing terminal 300. Next, the process in the managing apparatus 100 will be specifically described.

[Process in a Managing Apparatus 100]

Figure 11:
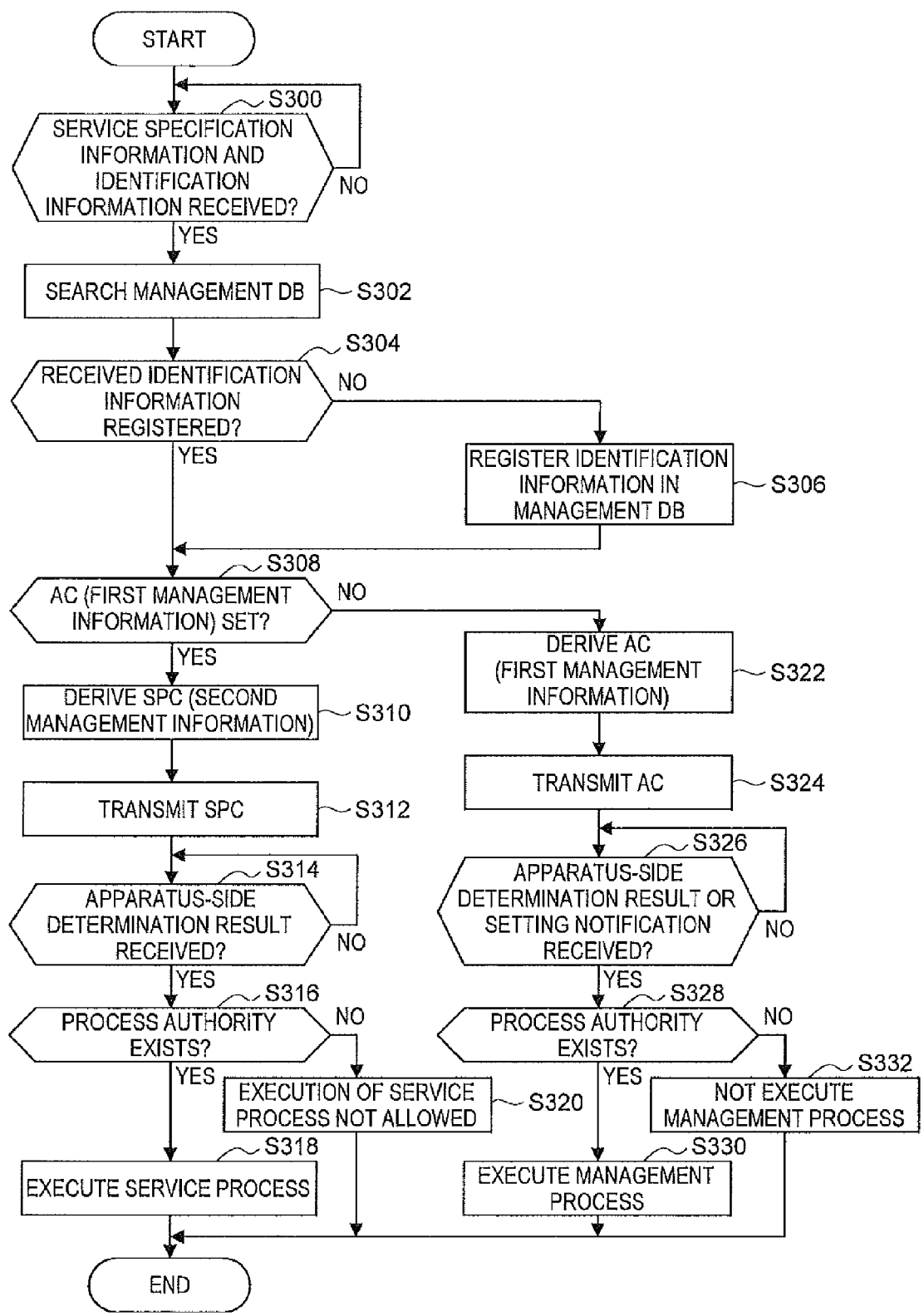
FIG. 11 is a flowchart illustrating an example of a process in a managing apparatus according to an embodiment.

FIG. 11 is a flowchart illustrating an example of a process in a managing apparatus 100 according to an embodiment. FIG. 11 shows a process with respect to one information processing apparatus 200. The managing apparatus 100 can sequentially or simultaneously execute the process shown in FIG. 11 with respect to each of the plurality of information processing apparatuses 200.

The managing apparatus 100 determines whether the identification information and the service specification information are received (S300). In Step S300, when it is determined that the identification information and the service specification information are not received, the managing apparatus 100 does not execute the following processes.

Further, in Step S300, when it is determined that the identification information and the service specification information are received, the managing apparatus 100 searches a management DB based on the received identification information (S302). In this case, the managing apparatus 100 converts the identification information received by the communication unit 102 into a database language such as an SQL and searches the management DB, but the present application is not limited thereto.

In Step S302, if the management DB is searched, the managing apparatus 100 determines whether the received identification information is registered in the management DB, based on the search result (S304). In Step S304, when it is determined that the identification information is not registered in the management DB, the managing apparatus 100 registers the identification information in the management DB (S306). Further, in Step S304, when it is determined that the identification information is registered in the management DB, the managing apparatus 100 does not execute the process of Step S306 and executes the following processes.

The managing apparatus 100 determines whether the first management information (AC) is set, based on the search result of the management DB in Step S302 (S308).

<A-1> Case Where First Management Information (AC) is not Set

In Step S308, when it is determined that the first management information (AC) is not set, the managing apparatus 100 derives the first management information (AC) that corresponds to the identification information received in Step S300 (S322). In addition, the managing apparatus 100 transmits the first management information (AC) derived in Step S322 to the information processing apparatus 200 that has transmitted the identification information received in Step S300 (S324).

In Step S324, if the first management information (AC) is transmitted, the managing apparatus 100 determines whether the setting notification (first setting notification/second setting notification) transmitted from the information processing apparatus 200 or the apparatus-side determination result (first apparatus-side determination result) is received (S326).

In Step S326, when it is determined that the setting notification or the apparatus-side determination result is not received, the managing apparatus 100 does not execute the following processes. Further, although not shown in FIG. 11, when the setting notification or the apparatus-side determination result is not received even though a predetermined time passes after the transmission of the first management information (AC) in Step S324, the managing apparatus 100 can complete the process (so-called timeout).

In Step S326, when it is determined that the setting notification or the apparatus-side determination result is received, the managing apparatus 100 determines whether a process authority with respect to the first communication unit 202 of the information processing apparatus 200 exists, based on the received setting notification or apparatus-side determination result (S328). In this case, the managing apparatus 100 determines that the process authority exists when the first setting notification or the first apparatus-side determination result is received and determines that the process authority does not exist when the second setting notification is received.

In Step S328, when it is determined that the process authority exists, the managing apparatus 100 executes a managing process that manages the first communication unit 202 of the information processing apparatus 200 corresponding to the identification information received in Step S300 (S330). In this case, the managing apparatus 100 records the first management information (AC) derived in Step S322 in the management DB, thereby executing a management process, but the present application is not limited thereto.

If the process of Step S330 is executed, the managing apparatus 100 can manage the first communication unit 202 of the information processing apparatus 200 that corresponds to the identification information received in Step S300.

Further, in Step S328, when it is determined that the process authority does not exist, the managing apparatus 100 does not execute a managing process that manages the first communication unit 202 of the information processing apparatus 200 that corresponds to the identification information received in Step S300 (S332). Accordingly, in the above case, the managing apparatus 100 can restrict the execution of a service in the information processing apparatus 200 that corresponds to the identification information received in Step S300.

<A-2> Case Where First Management Information (AC) is Set

In Step S308, when it is determined that the first management information (AC) is set, the managing apparatus 100 derives the second management information (SPC) that corresponds to the identification information received in Step S300 (S310). In addition, the managing apparatus 100 transmits the second management information (SPC) derived in Step S310 to the information processing apparatus 200 that has transmitted the identification information received in Step S300 (S312).

In Step S312, if the second management information (SPC) is transmitted, the managing apparatus 100 determines whether the apparatus-side determination result (second apparatus-side determination result/third apparatus-side determination result) transmitted from the information processing apparatus 200 is received (S314).

In Step S314, when it is determined that the apparatus-side determination result is not received, the managing apparatus 100 does not execute the following processes. Further, although not shown in FIG. 11, when the apparatus-side determination result is not received even though a predetermined time passes after the transmission of the second management information (SPC) in Step S314, the managing apparatus 100 can complete the process (so-called timeout), similar to Step S326.

In Step S314, when it is determined that the apparatus-side determination result is received, the managing apparatus 100 determines whether a process authority with respect to the first communication unit 202 of the information processing apparatus 200 exists, based on the received apparatus-side determination result (S316). In this case, the managing apparatus 100 determines that the process authority exists when the second apparatus-side determination result is received and determines that the process authority does not exist when the third apparatus-side determination result is received.

In Step S316, when it is determined that the process authority exists, the managing apparatus 100 allows a service corresponding to the second management information (SPC) derived in Step S310 to be executed, and executes a service process according to the corresponding service (S318). At this time, the managing apparatus 100 records the second management information (SPC) derived in Step S310 in the management DB. Accordingly, in the above case, the information processing apparatus 200 can enjoy a service using the information processing terminal 300.

Further, in Step S316, when it is determined that the process authority does not exist, the managing apparatus 100 does not allow the service corresponding to the second management information (SPC) derived in Step S310 to be executed. Accordingly, in the above case, the managing apparatus 100 can restrict the execution of a service in the information processing apparatus 200 that corresponds to the identification information received in Step S300.

The managing apparatus 100 executes the process shown in FIG. 11, thereby individually managing various services that the information processing apparatus 200 enjoys using the information processing terminal 300.

[Information Processing Apparatus 200]

Next, the configuration of the information processing apparatus 200 will be described. The information processing apparatus 200 includes a first communication unit 202, a second communication unit 204, a storage unit 206, a control unit 208, an operation unit 210, and a display unit 212.

Further, the information processing apparatus 200 may include a ROM (not shown) where control data, such as a program or an operation parameter, which is used by the control unit 208, is recorded, and a RAM (not shown) that primarily stores a program executed by the control unit 208. The information processing apparatus 200 connects the components through a bus that functions as a transmission path of data.

[Example of the Hardware Configuration of an Information Processing Apparatus 200]

Figure 12:
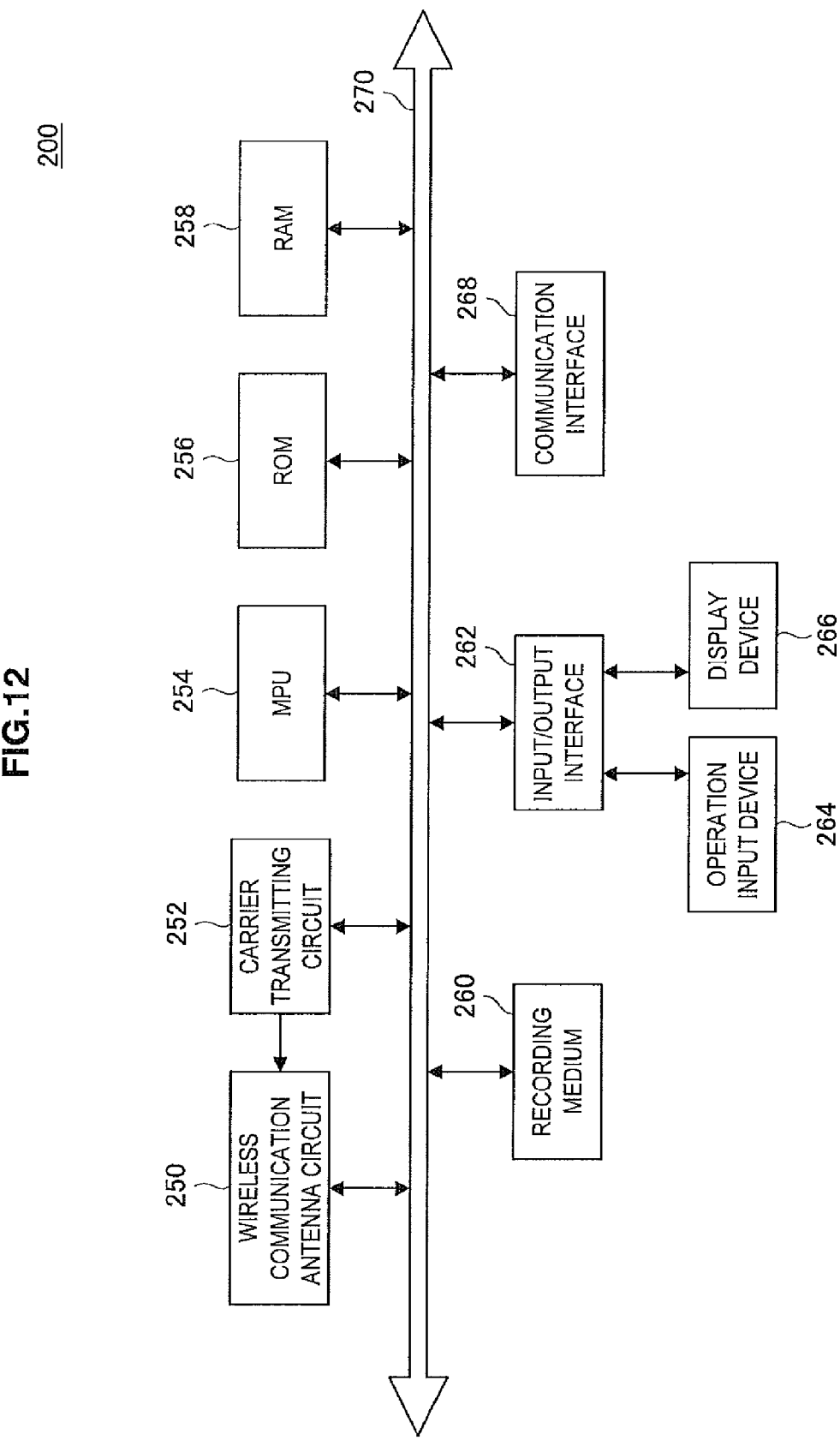
FIG. 12 is a diagram illustrating an example of the hardware configuration of an information processing apparatus according to an embodiment.

FIG. 12 is a diagram illustrating an example of the hardware configuration of an information processing apparatus 200 according to an embodiment. Referring to FIG. 12, the information processing apparatus 200 includes a wireless communication antenna circuit 250, a carrier transmitting circuit 252, an MPU 254, a ROM 256, a RAM 258, a recording medium 260, an input/output interface 262, an operation input device 264, a display device 266, and a communication interface 268. Further, the information processing apparatus 200 connects the components through a bus 270 that functions as a transmission path of data.

The wireless communication antenna circuit 250 is a first communication unit that is included in the information processing apparatus 200. The wireless communication antenna circuit 250 includes a resonance circuit that includes a capacitor having a predetermined capacitance and a coil having a predetermined inductance as a transmitting/receiving antenna, and a demodulating circuit. The wireless communication antenna circuit 250 transmits a carrier at a frequency of 13.56 MHz and performs envelope detection on an amplitude change in the voltage of an antenna end of the transmitting/receiving antenna, thereby detecting and demodulating a response signal that is transmitted from the information processing terminal 300. In this case, the transmission of the response signal is made when the information processing terminal 300 performs a load modulation to generate a demagnetizing field with respect to the carrier from the antenna of the information processing terminal 300. That is, the detection of the response signal in the wireless communication antenna circuit 250 corresponds to the detection of a change in impedance of the information processing terminal 300 when viewed from the information processing apparatus 200, which is generated by the load modulation in the information processing terminal 300.

The carrier transmitting circuit 252 includes a modulating circuit that performs an ASK modulation and an amplifying circuit that amplifies an output from the modulating circuit, and transmits a carrier that carries a carrier signal from the transmitting/receiving antenna of the wireless communication antenna circuit 250. Since the information processing apparatus 200 includes the carrier transmitting circuit 252, the information processing apparatus 200 can have a so-called reader/writer function. In this case, examples of a carrier signal that the carrier transmitting circuit 252 transmits from the wireless communication antenna circuit 250 may include signals that indicate an acquisition request of a variety of information, such as a system code or a service code, various commands, such as a read command of service data like electronic money, and a variety of information, such as the derived first management information (AC) or second management information (SPC). Further, in the carrier transmitting circuit 252, the transmission of the carrier is controlled by the MPU 254.

In the information processing apparatus 200, the wireless communication antenna circuit 250 and the carrier transmitting circuit 252 function as the first communication unit 202 that communicates with the information processing terminal 300 and forms the first communication path. The information processing apparatus 200 includes the wireless communication antenna circuit 250 and the carrier transmitting circuit 252, thereby communicating with the information processing terminal 300 in a non-contact manner. Further, the information processing apparatus 200 includes the wireless communication antenna circuit 250 and the carrier transmitting circuit 252, and allows the information processing terminal 300 to securely perform a read operation or an update operation on data where alteration of data, such as electronic money, which is stored by the information processing terminal 300, becomes an issue.

The MPU 254 functions as the control unit 208 that controls the entire information processing apparatus 200. Further, in the information processing apparatus 200, the MPU 254 can function as a service specification information generating unit 220, an information transmission control unit 222, an authority determining unit 224, and a processing unit 226, which will be described in detail below.

The ROM 256 stores control data, such as a program or an operation parameter, which is used by the MPU 254, and the RAM 258 primarily stores the program that is executed by the MPU 254.

The recording medium 260 functions as the storage unit 206, and stores a setting flag indicating whether the first management information (AC) is set, the first management information (AC), the second management information (SPC), connection information to connect to the managing apparatus 100, and an application. In this case, examples of the recording medium 260 may include a magnetic recording medium, such as a hard disk, and a nonvolatile memory, such as an EEPROM, a flash memory, an MRAM, a FeRAM, and a PRAM, but the present application is not limited thereto.

The input/output interface 262 connects the operation input device 264 or the display device 266. The operation input device 264 functions as the operation unit 210 and the display device 266 functions as the display unit 212. In this case, examples of the input/output interface 262 may include a USB terminal, a DVI terminal, and an HDMI terminal, but the present application is not limited thereto. Further, the operation input device 264, which is a button, a directional key, a rotational selector such as a jog dial, or a combination thereof, is provided on the information processing apparatus 200 and connected to the input/output interface 262 in the information processing apparatus 200. Further, the display device 266, which is an LCD or an organic EL display, is provided on the information processing apparatus 200 and connected to the input/output interface 262 in the information processing apparatus 200. Further, it is needless to say that the input/output interface 262 can be connected to an operation input device (for example, a keyboard or a mouse) or a display device (for example, an external display) as an external device of the information processing apparatus 200.

The communication interface 268 is a second communication unit that is included in the information processing apparatus 200, and functions as the second communication unit 204 that performs wired/wireless communication with an external device, such as the managing apparatus 100, through the network 500 (or directly). In this case, examples of the communication interface 268 may include a communication antenna and an RF circuit (wireless communication), an IEEE802.15.1 port and a transmitting/receiving circuit (wireless communication), an IEEE802.11b port and a transmitting/receiving circuit (wireless communication), and a LAN terminal and a transmitting/receiving circuit (wired communication), but the present application is not limited thereto.

For example, the communication interface 268 may be configured to correspond to the network 500.

By the hardware configuration shown in FIG. 12, the information processing apparatus 200 communicates with each of the managing apparatus 100 and the information processing terminal 300, and executes the process of (i) (transmission of information to the managing apparatus 100) and the process of (ii) (process based on the received management information). Accordingly, by the hardware configuration shown in FIG. 12, the information processing apparatus 200 can enjoy a service using the information processing terminal 300 while using the first communication unit 202 managed by the managing apparatus 100.

Referring back to FIG. 9, the configuration of the information processing apparatus 200 will be described. The first communication unit 202 is a first communication unit that is included in the information processing apparatus 200, and communicates with the information processing terminal 300 in a non-contract type. Further, in the first communication unit 202, identification information for identifying the first communication unit 202, such as a unique ID, is set. In this case, the identification information is stored in the storage unit such as the ROM that is included in the first communication unit 202, and the control unit 208 can appropriately read out the identification information from the storage unit. However, the present application is not limited thereto. For example, the identification information is stored in the storage unit 206, and the control unit 208 can read out the identification information from the storage unit 206. Further, the communication of the first communication unit 202 is controlled by the control unit 208.

The second communication unit 204 is a second communication unit that is included in the information processing apparatus 200, and performs wired/wireless communication with an external device, such as the managing apparatus 100, through the network 500 (or directly). Further, the communication of the second communication unit 204 is controlled by the control unit 208.

The storage unit 206 is a storage unit that is included in the information processing apparatus 200. The storage unit 206 stores a setting flag indicating whether the first management information (AC) is set, the set first management information (AC), the derived second management information (SPC), connection information (for example, IP (Internet Protocol) address) to connect to the managing apparatus 100, a derivation program to derive the second management information (SPC), and various applications. In this case, FIG. 9 shows an example of when the storage unit 206 stores a setting flag 230, an AC 232, and one SPC 234.

Further, examples of the storage unit 206 may include a magnetic recording medium, such a hard disk, and a nonvolatile memory, such as a flash memory, but the present application is not limited thereto.

The control unit 208 is composed of an MPU, and controls the entire information processing apparatus 200. Further, the control unit 208 includes a service specification information generating unit 220, an information transmission control unit 222, an authority determining unit 224, and a processing unit 226.

The service specification information generating unit 220 and the information transmission control unit 222 execute the process of (i) (transmission of information to the managing apparatus 100). The information transmission control unit 222 transmits an acquisition request of the first information, such as a system code, and an acquisition request of the second information, such as a service code, through the first communication unit 202. The service specification information generating unit 220 generates the service specification information, based on the first information and the second information that are acquired from the information processing terminal 300. In addition, the information transmission control unit 222 transmits the service specification information generated by the service specification information generating unit 220 and the identification information corresponding to the first communication unit 220 to the managing apparatus 100 through the second communication unit 204.

Further, the information transmission control unit 222 transmits a variety of information, such as a setting notification or an apparatus-side determination result, to the managing apparatus 100. That is, the information transmission control unit 222 functions as a communication control unit in the information processing apparatus 200.

The authority determining unit 224 and the processing unit 226 execute the process of (ii) (process based on the received management information). The authority determining unit 224 executes the processes of [ii-1] to [ii-4], based on the management information (first management information (AC)/second management information (SPC)) that is received by the second communication unit 204. Further, the processing unit 226 selectively executes a service process between the information processing terminal 300 and the processing unit 226, based on the result (authority determination result) of the process in the authority determining unit 224. Specifically, the processing unit 226 executes a service process, when it is determined that the second management information (SPC) derived by the authority determining unit 224 during the process of [ii-3] and the management information received by the second communication unit 204 are equal to each other.

FIG. 9 shows the case where an authority determining unit 224 and a processing unit 226 are provided to be separated from each other, but the configuration of the information processing apparatus according to the embodiment is not limited thereto. For example, the information processing apparatus according to the embodiment may configure the authority determining unit 224 and the processing unit 226 by one unit and one unit may execute the process of (ii) (process based on the received management information).

The control unit 208 includes a service specification information generating unit 220, an information transmission control unit 222, an authority determining unit 224, and a processing unit 226, and can execute the processes of (i) and (ii).

The operation unit 210 is an operation unit of the information processing apparatus 200 that enables a predetermined operation by a user. The information processing apparatus 200 includes the operation unit 210 and allows the information processing apparatus 200 to perform an operation that a user of the information processing apparatus 200 desires to perform. In this case, examples of the operation unit 210 may include an operation input device such as a keyboard or a mouse, a button, a directional key, a rotational selector such as a jog dial, and a combination thereof, but the present application is not limited thereto.

The display unit 212 is a display unit that is included in the information processing apparatus 200, and displays a variety of information on a display screen. For example, an operation screen that allows the information processing apparatus 200 to perform a desired operation or a screen that indicates a communication state with the managing apparatus 100 may be displayed on the display screen of the display unit 212, but the present application is not limited thereto. In this case, the display unit 212 may include an LCD or an organic EL display, but the present application is not limited thereto.

By the above configuration, the information processing apparatus 200 executes the process of (i) (transmission of information to the managing process 100) and the process of (ii) (process based on the received management information). Accordingly, by the above configuration, the information processing apparatus 200 can enjoy a service using the information processing terminal 300 while using the first communication unit 202 that is managed by the managing apparatus 100. Next, the process in the information processing apparatus 200 will be specifically described.

[Process in an Information Processing Apparatus 200]

Figure 13:
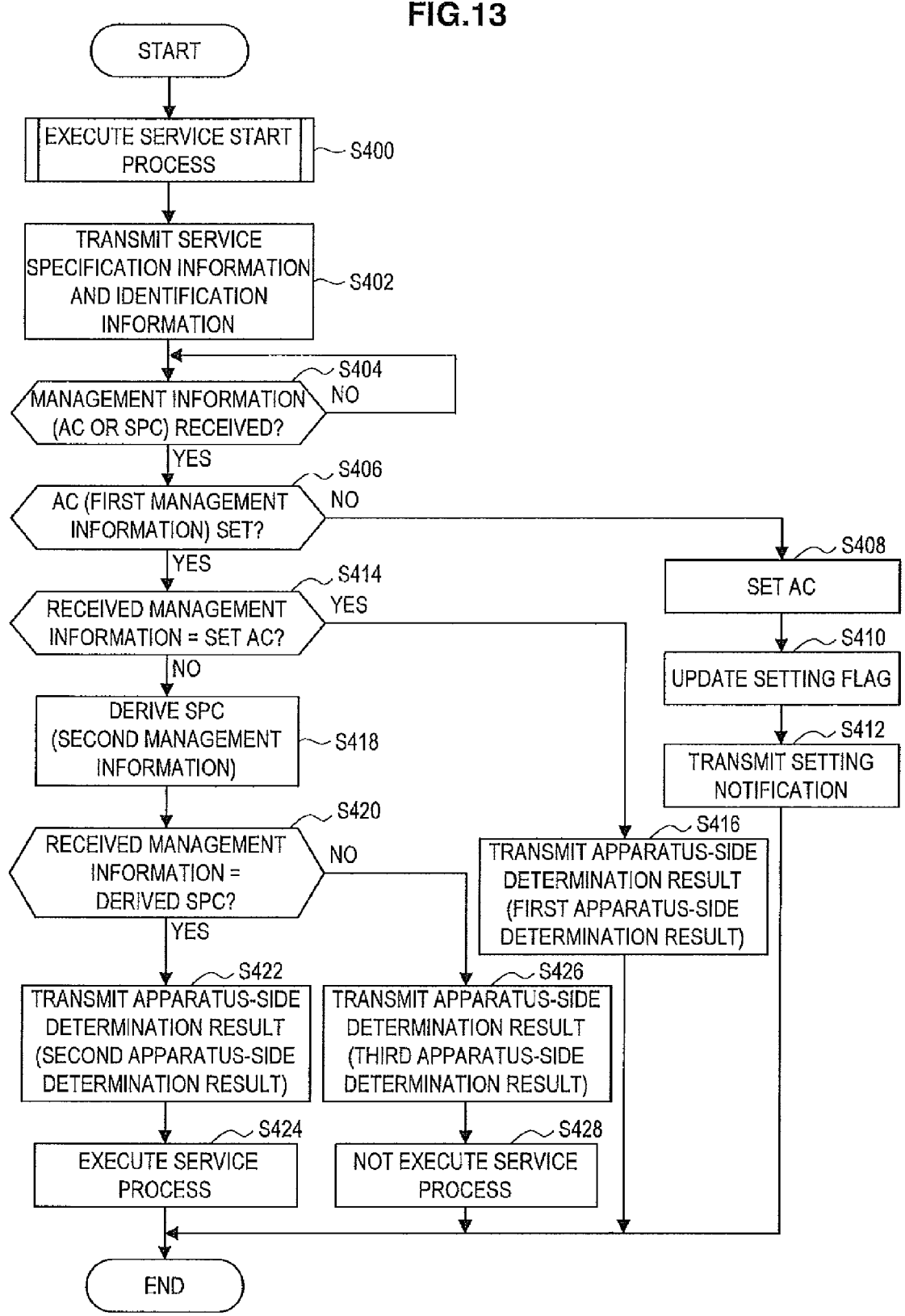
FIG. 13 is a flowchart illustrating an example of a process in an information processing apparatus according to an embodiment.

FIG. 13 is a flowchart illustrating an example of a process in an information processing apparatus 200 according to an embodiment. FIG. 13 shows a process with respect to one service. The information processing apparatus 200 can sequentially or simultaneously execute the process shown in FIG. 13 with respect to each of a plurality of services.

The information processing apparatus 200 executes a service start process (S400). In this case, during the service start process in the information processing apparatus 200, the first information and the second information may be acquired from the information processing terminal 300 or the service specification information may be generated based on the acquired first information and second information. Hereinafter, referring to FIG. 14, an example of the service start process in the information processing apparatus 200 will be described.

<Service Start Process>

Figure 14:
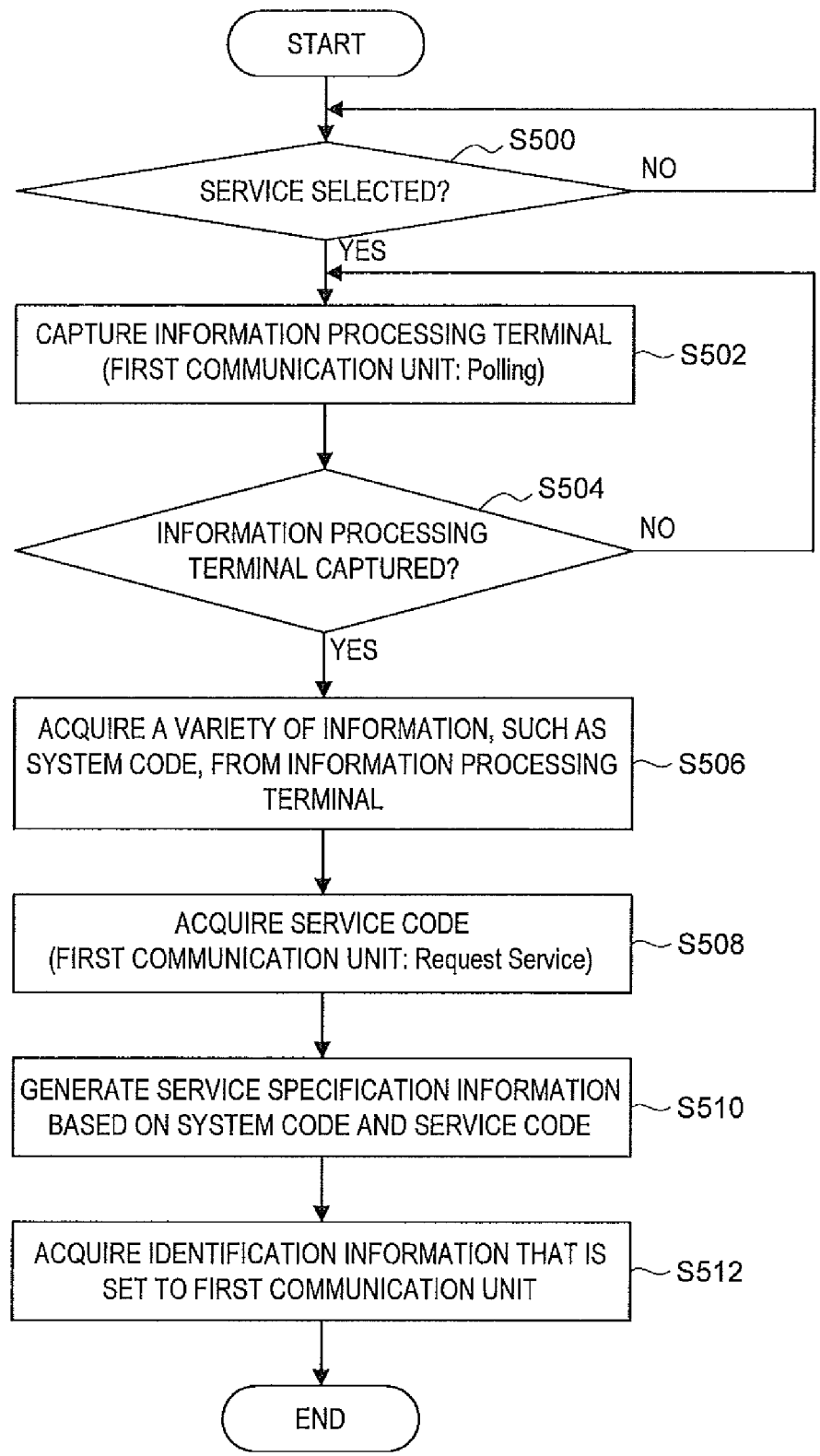
FIG. 14 is a flowchart illustrating an example of a service start process in an information processing apparatus according to an embodiment.

FIG. 14 is a flowchart illustrating an example of a service start process in an information processing apparatus 200 according to an embodiment. FIG. 14 shows an example of when the information processing apparatus 200 acquires a system code as the first information and a service code as the second information from the information processing terminal 300.

The information processing apparatus 200 determines whether a service is selected (S500). In Step S500, when it is determined that the service is not selected, the information processing apparatus 200 does not execute the following processes. In this case, the information processing apparatus 200 can execute a determining process of Step S500, based on an input signal that is transmitted form the operation unit 210 in accordance with the operation of the operation unit 210 by the user, but the present application is not limited thereto.

Further, in Step S500, when it is determined that the service is selected, the information processing apparatus 200 captures the information processing terminal 300 (S502). In addition, the information processing apparatus 200 determines whether the information processing terminal 300 is captured (S504). In this case, the information processing apparatus 200 can execute the processes of Steps S502 and S504, when the first communication unit 202 performs polling.

In Step S504, when it is determined that the information processing terminal 300 is not captured, the information processing apparatus 200 repeats the processes starting from Step S502. Although not shown in FIG. 14, when it is determined that the information processing terminal 300 is not captured even though a predetermined time passes after it is determined that the service is selected in Step S500, the information processing apparatus 200 can complete the process (so-called timeout).

In Step S504, when it is determined that the information processing terminal 300 is captured, the information processing apparatus 200 acquires a variety of information, such as a system code (an example of the first information), from the information processing terminal 300 (S506). In this case, the information processing apparatus 200 transmits the acquisition request from the first communication unit 202, thereby executing the process of Step S506.

In Step S506, if the system code (an example of the first information) is acquired, the information processing apparatus 200 acquires a service code (an example of the second information) from the information processing terminal 300 (S508). In this case, the information processing apparatus 200 can execute the process of Step S508 by allowing the first communication unit 202 to transmit a "Request Service" command (an example of the acquisition request).

FIG. 14 shows the case where the information processing apparatus 200 individually executes the process of Step S506 and the process of Step S508, but the present application is not limited thereto. For example, the information processing apparatus according to the embodiment can execute the process of Step S506 and the process of Step S508 as one process.

In Step S508, if the service code (an example of the second information) is acquired, the information processing apparatus 200 generates the service specification information, based on the system code (an example of the first information) acquired in Step S506 and the acquired service code (S510). In this case, the information processing apparatus 200 may combine the system code (an example of the first information) and the service code (an example of the second information) as shown in FIG. 6, thereby executing the process of Step S510.

In Step S510, if the service specification information is generated, the information processing apparatus 200 acquires the identification information that is set to the first communication unit 202 (S512). In this case, the information processing apparatus 200 reads out the identification information from the storage unit 206 or the storage unit that is included in the first communication unit 202, thereby executing the process of Step S512.

The information processing apparatus 200 executes, for example, a series of processes shown in FIG. 14, as a service start process. Further, it is needless to say that the service start process in the information processing apparatus 200 is not limited to the process shown in FIG. 14.

Referring back to FIG. 13, the process in the information processing apparatus 200 will be described. In Step S400, if the service process is executed, the information processing apparatus 200 transmits the generated service specification information and the identification information to the managing apparatus 100 (S402).

In Step S402, if the service specification information and the identification information are transmitted, the information processing apparatus 200 determines whether the management information (first management information (AC)/second management information (SPC)) transmitted from the managing apparatus 100 is received (S404).

In Step S404, when it is determined that the management information (first management information (AC)/second management information (SPC)) is not received, the information processing apparatus 200 does not execute the following processes. Further, although not shown in FIG. 13, when the management information is not received even though a predetermined time passes after the transmission of the service specification information and the identification information in Step 402, the information processing apparatus 200 can complete the process (so-called timeout).

In Step S406, when it is determined that the management information (first management information (AC)/second management information (SPC)) is received, the information processing apparatus 200 determines whether the first management information (AC) is set (S406). In this case, the information processing apparatus 200 can execute the determining process of Step S406, based on the setting flag that is stored in the storage unit 206.

<B-1> Case Where First Management Information (AC) is Not Set

In Step S406, when it is determined that the first management information (AC) is not set, the information processing apparatus 200 sets the received management information as the first management information (AC) (S408). In this case, the information processing apparatus 200 records the first management information (AC) in the storage unit 206, thereby executing the process of Step S406.

If the process of Step S408 is executed, the information processing apparatus 200 updates a setting flag in accordance with the process result of Step S408 (S410). For example, the information processing apparatus 200 sets a the setting flag as a value indicating that the setting is completed, when the first management information (AC) is normally recorded in the storage unit 206. Further, the information processing apparatus 200 sets the setting flag as a value indicating that the setting is not completed, when the first management information (AC) is not normally recorded in the storage unit 206.

In Step S410, if the setting flag is updated, the information processing apparatus 200 transmits a setting notification (first setting notification/second setting notification) according to the setting flag to the managing apparatus 100 (S412).

<B-2> Case Where First Management Information (AC) is Set

In Step S406, when it is determined that the first management information (AC) is set, the information processing apparatus 200 determines whether the received management information and the set first management information (AC) are equal to each other (S414).

<B-2-1> Case of Received Management Information=Set First Management Information (AC)

In Step S414, when it is determined that the received management information and the set first management information (AC) are equal to each other, the information processing apparatus 200 transmits the first apparatus-side determination result to the managing apparatus 100 (S416). In the above case, the first communication unit 202 of the information processing apparatus 200 is managed by the managing apparatus 100.

<B-2-2> Case of Received Management Information ≠ Set First Management Information (AC)

In Step S414, when it is determined that the received management information and the set first management information (AC) are not equal to each other, the information processing apparatus 200 derives the second management information (SPC) (S418). In this case, the information processing apparatus 200 derives the second management information (SPC) using the deriving method shown in FIG. 5, based on the set first management information (AC) and the service specification information transmitted in Step S402.

In Step S418, if the second management information (SPC) is derived, the information processing apparatus 200 determines whether the received management information and the derived second management information (SPC) are equal to each other (S420).

<B-2-3> Case of Received Management Information=Derived Second Management Information (SPC)

In Step S420, when it is determined that the received management information and the derived second management information (SPC) are equal to each other, the information processing apparatus 200 transmits the second apparatus-side determination result to the managing apparatus 100 (S422).

In the above case, execution of a service that corresponds to the derived second management information (SPC) is allowed by the managing apparatus 100. Accordingly, in Step S422, if the second apparatus-side determination result is transmitted, the information processing apparatus 200 executes a service process between the information processing terminal 300 and the information processing apparatus 200 (S424). Further, the information processing apparatus 200 can start the process of Step S424, after receiving a response transmitted from the managing apparatus 100 in accordance with the transmitted second apparatus-side determination result.

Accordingly, in the above case, the information processing apparatus 200 can enjoy a service using the information processing terminal 300 while using the first communication unit 202 that is managed by the managing apparatus 100.

<B-2-4> Case of Received Management Information ≠ Derived Second Management Information (SPC)

In Step S420, when it is determined that the received management information and the derived second management information (SPC) are not equal to each other, the information processing apparatus 200 transmits the third apparatus-side determination result to the managing apparatus 100 (S426). In the above case, execution of a service that corresponds to the derived second management information (SPC) is not allowed by the managing apparatus 100. Accordingly, the information processing apparatus 200 does not execute a service process between the information processing terminal 300 and the information processing apparatus 200 (S428).

The information processing apparatus 200 executes the processes shown in FIGS. 13 and 14, thereby enjoying a service using the information processing terminal 300 while using the first communication unit 202 that is managed by the managing apparatus 100.

As such, the information processing system 1000 according to the embodiment includes the managing apparatus 100, the information processing apparatus 200, and the information processing terminal 300.

In this case, the managing apparatus 100 executes the process of (I) (process target determining process), the process of (II) (management information deriving process), and the process of (III) (process based on the transmission of the management information and the response from the information processing apparatus 200). Accordingly, the managing apparatus 100 can individually manage various services that the information processing apparatus 200 enjoys using the information processing terminal 300.

Further, the information processing apparatus 200 executes the process of (i) (transmission of information to the managing apparatus 100) and the process of (ii) (process based on the received management information). Accordingly, the information processing apparatus 200 can enjoy a service using the information processing terminal 300 while using the first communication unit 202 that is managed by the managing apparatus 100.

Accordingly, it is possible to realize the information processing system 1000 where the managing apparatus 100 can individually manage various services that the information processing apparatus 200 enjoys using the information processing terminal 300 that stores service data related to a service. Further, since the managing apparatus 100 that constitutes the information processing system 1000 manages a service that can be executed with respect to each information processing apparatus 200, the service in each information processing apparatus 200 can be more flexibly managed, in the information processing system 1000.

[Application Example of an Information Processing System 1000]

If the information processing system 1000 is used, the managing apparatus 100 can manage a service that can be executed with respect to each information processing apparatus 200. Accordingly, if the information processing system 1000 is used, the following effects can be realized.

Restriction of a service that can be executed with respect to each information processing apparatus 200

Realization of a business model that charges for a service (or addition of a function by provision of a program) that can be executed with respect to each information processing apparatus 200

Provision of information (for example, sales promotion information or program) according to a service that can be executed with respect to each information processing apparatus 200

As the component that constitutes the information processing system 1000 according to the embodiment, the managing apparatus 100 has been exemplified, but the embodiment is not limited to the above example. The embodiment can be applied to various apparatuses, such as a computer like a PC or a server.

Further, as the component that constitutes the information processing system 1000 according to the embodiment, the information processing apparatus 200 has been exemplified, but the embodiment is not limited to the above example. The embodiment can be applied to various apparatuses, such as a computer like a PC, a portable communication apparatus like a mobile phone or a PHS (Personal Handyphone System), and a game machine like PlayStation (registered trademark) series.

Furthermore, as the component that constitutes the information processing system 1000 according to the embodiment, the information processing terminal 300 has been exemplified, but the embodiment is not limited to the above example. The embodiment can be applied to various apparatuses, such as an IC card where a non-contact IC chip is mounted, a television receiver that receives television broadcasting and displays video, a video/music reproducing apparatus like a WALK MAN (registered trademark), and a portable game machine like PlayStation Portable (registered trademark).

(Program According to an Information Processing System 1000)

[Program According to a Managing Apparatus 100]

If a program that allows a computer to function as the managing apparatus 100 according to the embodiment is used, it is possible to individually manage various services that the information processing apparatus 200 enjoys using the information processing terminal 300.

[Program According to an Information Processing Apparatus 200]

If a program that allows a computer to function as the information processing apparatus 200 according to the embodiment is used, it is possible to enjoy a service using the information processing terminal 300 while using the first communication unit 202 that is managed by the managing apparatus 100.

For example, FIG. 9 shows the configuration where the information processing apparatus 200 includes the first communication unit 202 and the second communication unit 204, but the embodiment is not limited to the above example. For example, the information processing apparatus according to the embodiment can use the first communication unit 202 as an external device, as in the information processing apparatus 200A and the reader/writer 290 shown in FIG. 1. Even in the above configuration, since the managing apparatus according to the embodiment can manage the first communication unit as the external device, the information processing apparatus can enjoy a service using the information processing terminal while using the first communication unit that is managed by the managing apparatus.

In the above description, the program (computer program) allowing the computer to function as the managing apparatus 100 and the information processing apparatus 200 according to the embodiment is provided. However, in the embodiment, a storage medium that stores the program can also be provided.

It should be understood that various changes and modifications to the presently preferred embodiments described herein will be apparent to those skilled in the art. Such changes and modifications can be made without departing from the spirit and scope of the present application and without diminishing its intended advantages. It is therefore intended that such changes and modifications be covered by the appended claims.

The application is claimed as follows:

1. A managing apparatus comprising:
a management-side communication unit that communicates with an information processing apparatus including a first communication unit and a second communication unit, the first communication unit communicating on a first communication path in a non-contact manner with an information processing terminal storing first information indicating a corresponding system and second information indicating a corresponding service, the first communication path using a carrier at a predetermined frequency, the second communication unit communicating with an external device on a second communication path different from the first communication path;
a processor; and
a memory device storing instructions which when executed by the processor, causes the processor to:
determine whether the first communication unit of the information processing apparatus is managed by the managing apparatus, based on identification information for identifying the first communication unit of the information processing apparatus that is received by the management-side communication unit;
derive management information for managing the first communication unit of the information processing apparatus, based on a determination result of whether the first communication unit of the information processing apparatus is managed by the managing apparatus, the identification information received by the management-side communication unit, and service specification information for the information processing terminal to identify the corresponding service, based on the first information and the second information received by the management-side communication unit, wherein the derived management information includes first management information including an activation code when the first communication unit of the information processing apparatus is not managed by the managing apparatus, and the derived management information includes second management information including a service provider code for managing a service, separate from the first management information, when the first communication unit is managed by the managing apparatus;
associate the service provider code included in the second management information with the activation code included in the first management information;

transmit the derived management information to the information processing apparatus through the management-side communication unit;

determine a process authority with respect to the information processing apparatus, based on a process result transmitted from the information processing apparatus in accordance with the received management information; and selectively execute a process related to the information processing apparatus, based on a determination result of the process authority.

2. The managing apparatus according to claim 1, the first management information indicates that the first communication unit of the information processing apparatus is managed, based on the identification information received by the management-side communication unit; and the second management information manages a service process between the first communication unit of the information processing apparatus and the information processing terminal, based on the first management information corresponding to the identification information and the service specification information.

3. The managing apparatus according to claim 2, wherein the memory device storing instructions which when executed by the processor, further causes the processor to:

determine that executing a service corresponding to the second management information is enabled, when the corresponding information is equal to the transmitted second management information, and execute a service process related to a service between the information processing apparatus and the processing unit.

4. The managing apparatus according to claim 2, further comprising:

a storage unit that stores third management information where the identification information, the first management information, and the second management information are associated with each other and stored, and wherein the memory device storing instructions which when executed by the processor, further causes the processor to:

determine whether the first communication unit corresponding to the identification information is managed, based on the identification information.

5. The managing apparatus according to claim 4, wherein the memory device storing instructions which when executed by the processor, further causes the processor to:

record the first management information in the third management information, when the corresponding information is equal to the transmitted first management information, and associate the second management information with the first management information corresponding to the identification information and record an association result in the third management information, when the corresponding information is equal to the transmitted second management information.

6. The managing apparatus according to claim 4, wherein the storage unit stores a management database as the third management information, and wherein the memory device storing instructions which when executed by the processor, further causes the processor to:

search the management database based on the identification information, thereby specifying the first management information corresponding to the identification information.

7. An information processing apparatus comprising:

a first communication unit that communicates on a first communication path in a non-contact manner with an information processing terminal storing first information indicating a corresponding system and second information indicating a corresponding service, the first communication path using a carrier at a predetermined frequency;

a second communication unit that communicates with a managing apparatus managing a service between the managing apparatus and the information processing terminal using the first communication path, on a second communication path that is different from the first communication path;

a processor; and a memory device storing instructions which when executed by the processor, causes the processor to:

acquire the first information and the second information from the information processing terminal through the first communication unit, and generates service specification information for the information processing terminal to identify the corresponding service, based on the acquired first information and second information;

transmit identification information for identifying the first communication unit and the generated service specification information to the managing apparatus through the second communication unit;

determine whether the first communication unit is managed by the managing apparatus, based on management information for managing the first communication unit that is transmitted from the managing apparatus and received by the second communication unit and transmitted from the managing apparatus, wherein the management information includes first managed information including an activation code when the first communication unit of the information processing apparatus is not managed by the managing apparatus, and the management information includes second managed information including a service provider code for managing a service, separate from the first managed information, when the first communication unit is managed by the managing apparatus;

associate the service provider code included in the second management information with the activation code included in the first management information;

transmit a process result indicating a determination result to the managing apparatus through the second communication unit; and selectively execute a service process executed between the information processing terminal and the processor, based on a determination result of whether the first communication unit is managed by the managing apparatus.

8. The information processing apparatus according to claim 7, further comprising a storage unit that stores first stored management information indicating that the first communication unit is managed, wherein the memory device storing instructions which when executed by the processor, further causes the processor to:

record the management information received by the second communication unit as the first management information, when the first management information is not stored in the storage unit.

9. The information processing apparatus according to claim 8, wherein the memory device storing instructions which when executed by the processor, further causes the processor to:
compare the first management information stored in the storage unit and the management information received by the second communication unit, when the first management information is stored in the storage unit, and
transmit a process result indicating that the first management information and the management information are equal to each other to the managing apparatus through the second communication unit, when the first management information and the management information are equal to each other.

10. The information processing apparatus according to claim 9, wherein the memory device storing instructions which when executed by the processor, further causes the processor to:
derive second management information for the managing apparatus to manage a service process between the first communication unit and the information processing terminal, based on the first management information and the second information acquired from the information processing terminal, when the first management information and the management information are not equal to each other, and
compare the derived second management information and the management information received by the second communication unit and a process result according to a comparison result to the managing apparatus through the second communication unit.

11. The information processing apparatus according to claim 10, wherein the memory device storing instructions which when executed by the processor, further causes the processor to:
selectively execute the service process, when the authority determining unit transmits a process result indicating that the derived second management information and the management information received by the second communication unit are equal to each other.

12. A non-transitory computer readable storage medium storing a computer program for causing a managing apparatus to: communicate, via a communication unit, with an information processing apparatus including a first communication unit and a second communication unit, the first communication unit communicating on a first communication path in a non-contact manner with an information processing terminal storing first information indicating a corresponding system and second information indicating a corresponding service, the first communication path using a carrier at a predetermined frequency, the second communication unit communicating with an external device on a second communication path that is different from the first communication path;
determine whether the first communication unit of the information processing apparatus is a management target, based on identification information for identifying the first communication unit of the information processing apparatus that is received by the communication unit;
derive management information for managing the first communication unit of the information processing apparatus, whether the first communication unit of the information processing apparatus is managed by the managing apparatus, the identification information received by the communication unit, and service specification information for the information processing terminal to identify the corresponding service, based on the first information and the second information received by the communication unit, wherein the derived management information includes first management information including an activation code when the first communication unit of the information processing apparatus is not managed by the managing apparatus, and the derived management information includes second management information including a service provider code for managing a service, separate from the first management information, when the first communication unit is managed by the managing apparatus;
associate the service provider code included in the second management information with the activation code included in the first management information;
transmit the derived management information to the information processing apparatus through the communication unit;
determine a process authority with respect to the information processing apparatus, based on a process result transmitted from the information processing apparatus in accordance with the received management information; and
selectively execute a process related to the information processing apparatus, based on a determination result of whether the first communication unit of the information processing apparatus is managed by the managing apparatus.

13. A non-transitory computer readable storage medium storing a computer program for causing an apparatus to:
communicate, via a first communication unit, on a first communication path in a non-contact manner with an information processing terminal storing first information indicating a corresponding system and second information indicating a corresponding service, the first communication path using a carrier at a predetermined frequency;
communicate, via a second communication unit, with a managing apparatus managing a service between the managing apparatus and the information processing terminal using the first communication unit, on a second communication path that is different from the first communication path;
acquire the first information and the second information from the information processing terminal through the first communication unit, and generate service specification information for the information processing terminal to identify the corresponding service, based on the acquired first information and second information;
transmit identification information for identifying the first communication unit and the generated service specification information to the managing apparatus through the second communication unit;
determine whether the first communication unit is managed by the managing apparatus, based on management information for managing the first communication unit that is transmitted from the managing apparatus and received by the second communication unit, wherein the management information includes first managed information including an activation code when the first communication unit of the information processing apparatus is not managed by the managing apparatus, and the management information includes second managed information including a service provide code for managing a service, separate from the first managed information, when the first communication unit is managed by the managing apparatus;

associate the service provider code included in the second management information with the activation code included in the first management information;

transmit a process result indicating a determination result to the managing apparatus through the second communication unit; and selectively execute a service process executed between the information processing terminal and the apparatus, based on a determination result of whether the first communication unit is managed by the managing apparatus.

14. An information processing system comprising:

one or more information processing apparatuses that communicate with an information processing terminal in a non-contact manner using a carrier at a predetermined frequency; and a managing apparatus that communicates with the information processing apparatuses, wherein each of the information processing apparatuses includes a first communication unit that communicates on a first communication path in a non-contact manner with the information processing terminal, the first communication path using a carrier at a predetermined frequency, a second communication unit that communicates with the managing apparatus on a second communication path that is different from the first communication path, a first processor; and a first memory device storing instructions which when executed by the first processor, causes the first processor to:

generate service specification information for the information processing terminal to identify a corresponding service, transmit identification information for identifying the first communication unit and the generated service specification information to the managing apparatus through the second communication unit, determine whether the first communication unit is managed by the managing apparatus, based on management information for managing the first communication unit that is transmitted from the managing apparatus and received by the second communication unit, transmit a process result indicating a determination result to the managing apparatus through the second communication unit, and selectively execute a service process executed between the information processing terminal and the processing unit, based on a determination result of whether the first communication unit is managed by the managing apparatus, and the managing apparatus includes a management-side communication unit that communicates with the information processing apparatus, a second processor, and a second memory device storing instructions which when executed by the second processor, causes the second processor to:

determine whether the first communication unit of the information processing apparatus is a management target, based on the identification information of the information processing apparatus that is received by the management-side communication unit, derive the management information, based on a determination result of the process target determining unit, the identification information received by the management-side communication unit, and the service specification information received by the management-side communication unit, wherein the derived management information includes first management information including an activation code when the first communication unit of the information processing apparatus is not managed by the managing apparatus, and the derived management information includes second management information including a service provider code for managing a service, separate from the first management information, when the first communication unit is managed by the managing apparatus, associate the service provider code included in the second management information with the activation code included in the first management information;

transmit the derived management information to the information processing apparatus through the management-side communication unit, determine a process authority with respect to the information processing apparatus, based on the process result transmitted from the information processing apparatus in accordance with the received management information, and selectively execute a process related to the information processing apparatus, based on a determination result of the process authority.

15. The managing apparatus according to claim 1, wherein the instructions further cause the processor to:

set an authority to perform the service corresponding to the second management information when the associated activation code included in the first management information exists.

16. The managing apparatus according to claim 1, wherein the second management information includes a plurality of service provider codes corresponding to a plurality of services.

17. The managing apparatus according to claim 1, wherein the service managed by the second management information includes at least one of a read process of service data and a write process of service data.

* * * * *